United States Patent
Minto

(10) Patent No.: US 12,024,263 B2
(45) Date of Patent: Jul. 2, 2024

(54) ARTICULATED PARALLELOGRAM BICYCLE ELECTRIC/ELECTRONIC DERAILLEUR

(71) Applicant: CAMPAGNOLO S.R.L., Vicenza (IT)

(72) Inventor: Marco Minto, Mirano (IT)

(73) Assignee: CAMPAGNOLO S.r.l., Vicenza (IT)

( * ) Notice: Subject to any disclaimer, the term of this patent is extended or adjusted under 35 U.S.C. 154(b) by 0 days.

(21) Appl. No.: 18/309,042

(22) Filed: Apr. 28, 2023

(65) Prior Publication Data

US 2023/0365226 A1     Nov. 16, 2023

(30) Foreign Application Priority Data

May 13, 2022 (IT) .......................... 102022000009935

(51) Int. Cl.
*B62M 9/124* (2010.01)
*B62M 9/122* (2010.01)
(Continued)

(52) U.S. Cl.
CPC ............ *B62M 9/124* (2013.01); *B62M 9/122* (2013.01); *B62M 9/126* (2013.01); *G01B 7/30* (2013.01); *G01D 5/145* (2013.01); *G01D 5/16* (2013.01)

(58) Field of Classification Search
CPC ...... B62M 9/124; B62M 9/122; B62M 9/126; G01B 7/30; G01D 5/145; G01D 5/16
(Continued)

(56) References Cited

U.S. PATENT DOCUMENTS 10,053,189 B2   8/2018   Pasqua
10,696,358 B2   6/2020   Bernardele
(Continued)

FOREIGN PATENT DOCUMENTS

EP     1279929 A2    1/2003
EP     2865589 A1    4/2015
(Continued)

OTHER PUBLICATIONS

Italian Search Report and Written Opinion for Italian Application No. IT202200009935 filed on May 13, 2022 on behalf of Campagnolo S.R.L. Mail Date: Nov. 30, 2022 10 pages (English + Original).

*Primary Examiner* — Gene O Crawford
*Assistant Examiner* — Emily R Kincaid
(74) *Attorney, Agent, or Firm* — Steinfl + Bruno LLP

(57) ABSTRACT

A bicycle electric/electronic derailleur has mutually movable components, and a geared motor for controlling the mutual motion of the components. The geared motor includes an electric motor having a drive shaft, an output shaft and a speed reducer including at least one gear between the drive shaft and the output shaft. The output shaft defines at least in part one of the articulation axes. The electric motor is rigidly connected to a first component, and a second component integrally rotates with the output shaft. The derailleur further includes a magnetic rotary encoder for transducing a quantity related to the mutual motion of the components. The encoder includes a permanent magnet and a sensor responding to the changes in the magnetic field of the magnet. The magnet is a disc, cylindrical or annular magnet having diametral magnetization, and is coaxial with and arranged to integrally rotate with the output shaft.

14 Claims, 13 Drawing Sheets

(51) Int. Cl.
　　　*B62M 9/126*　　　(2010.01)
　　　*G01B 7/30*　　　(2006.01)
　　　*G01D 5/14*　　　(2006.01)
　　　*G01D 5/16*　　　(2006.01)

(58) Field of Classification Search
　　　USPC .......................................................... 474/82
　　　See application file for complete search history.

(56) References Cited

U.S. PATENT DOCUMENTS

| | | | | |
|---|---|---|---|---|
| 2017/0341708 A1* | 11/2017 | Bernardele | ............ | B62M 9/132 |
| 2018/0001960 A1* | 1/2018 | Pasqua | ................... | B62M 25/08 |
| 2021/0129939 A1* | 5/2021 | Sala | ....................... | B62M 9/128 |
| 2022/0081066 A1* | 3/2022 | Fujimoto | ............... | B62M 25/08 |
| 2023/0099532 A1* | 3/2023 | Pasqua | .................. | B62M 9/122 |
| | | | | 474/82 |

FOREIGN PATENT DOCUMENTS

| | | | |
|---|---|---|---|
| EP | 2868566 | A1 | 5/2015 |
| EP | 3009340 | A1 | 4/2016 |
| EP | 3190039 | A1 | 7/2017 |
| EP | 3251941 | A1 | 12/2017 |
| EP | 3266694 | A1 | 1/2018 |
| EP | 4155186 | A1 | 3/2023 |

* cited by examiner

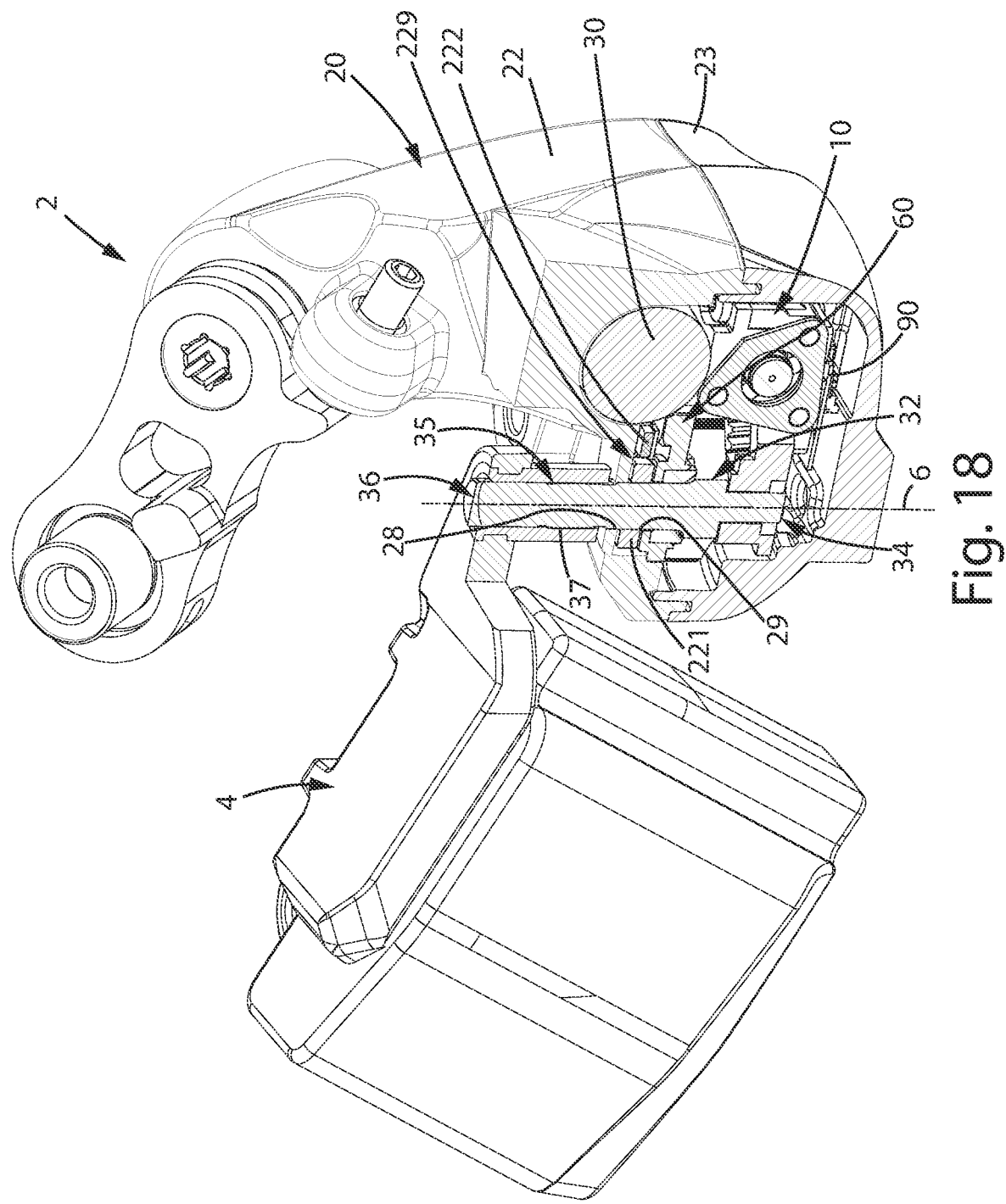

ARTICULATED PARALLELOGRAM BICYCLE ELECTRIC/ELECTRONIC DERAILLEUR

CROSS-REFERENCE TO RELATED APPLICATIONS

The present application claims priority to Italian Patent Application No. 102022000009935 filed on May 13, 2022, the contents of which are incorporated herein by reference in their entirety.

TECHNICAL FIELD

The present disclosure relates to an articulated parallelogram bicycle electric/electronic derailleur.

BACKGROUND

In the present description and in the attached claims, the expression "electric/electronic" is used to indicate an electric device that may also include electronic components and/or a data processing system.

A motion transmission system in a bicycle typically comprises a closed-loop chain extending between toothed wheels associated with the bottom bracket spindle and with the hub of the rear wheel, respectively.

When, in correspondence of at least one of the bottom bracket spindle and the hub of the rear wheel, a group of coaxial toothed wheels (comprising more than one toothed wheel) is present, respectively also called chain rings and sprockets, and the motion transmission system is thus provided with a gearshift, a front derailleur and/or a rear derailleur is/are provided for bringing the transmission chain into engagement with a preselected toothed wheel, thus changing the gear ratio.

In some cases, the chain is replaced by a toothed belt, but for the sake of brevity hereinafter and in the attached claims, term "chain" will be used to refer to both cases of motion transmission member between the two toothed wheels, in particular in the expression "chain guide".

An articulated parallelogram bicycle derailleur comprises a plurality of mutually movable components, comprising a support body configured to be attached to a bicycle frame, a chain guide, and a pair of connecting arms for connection between the support body and the chain guide at respective articulation axes.

In the present description and in the attached claims, term "chain guide" is used to indicate the component which, overall, is moved with respect to the support body and to the connecting arms; in the case of a rear derailleur it may include a first member articulated in the articulated parallelogram, sometimes called "bottom body", and a second member movable therewith, sometimes called "rocker arm", while in the case of a front derailleur it typically comprises a single member, sometimes called "cage".

While in the case of a mechanical gearshift, the derailleurs are controlled exclusively by the cyclist through one or more manual control devices, for example mounted on the handlebars, and the mutual motion of the components in order to change the parallelogram angles is forced for example through a sheathed inextensible cable (also known as Bowden cable), in the case of an electric/electronic gearshift, the derailleur comprises a geared motor for mutually moving said components.

In the present description and in the attached claims, under term "geared motor", a motor coupled with a speed reducer is meant to be indicated, the speed reducer including at least one gear and preferably a gear train.

In the present description and in the attached claims, under term "gear", a mechanism which is used to transmit movement, through a pair of toothed members, is meant to be indicated.

In the articulated parallelogram bicycle electric/electronic derailleurs of the kind of interest herein, the output shaft of the geared motor is coaxial to, and defines at least in part, an articulation axis of the articulated parallelogram, in order to directly control the angular position of one of the mutually movable components, for example one of the connecting arms, with respect to that of the component bearing the geared motor.

For controlling the geared motor, signals issued by electric/electronic manual control devices and/or processed by a data processing system, on the basis of detected quantities relating to the status of the cyclist and/or of the bicycle (derailleurs included) and/or of the route, are used, so that the gearshift may generally operate in manual mode (which on the other hand is the only one available in the case of a mechanical gearshift), in totally automatic mode and/or in semiautomatic mode.

An electric/electronic derailleur typically comprises a transducer of a quantity related to the mutual motion of the components of the derailleur, also called encoder. The quantity is for example a position and/or a displacement and/or a speed and/or an acceleration and/or a displacement direction. The quantity is, for example, an angular quantity, and thus it is a rotary encoder. The displacement direction, if transduced, is a rotation direction. The transducer signal is used in a suitable manner for controlling the derailleur: for example, the motor may be powered until the transducer signal corresponds to the intended position, or the motor may be powered for a predetermined time and possibly powered again to correct the position in case the transducer signal does not correspond to the intended position.

As is well known, a magnetic encoder is based on the change in the magnetic flux generated by a magnet in a relative motion with respect to magnetic sensor (or to a pair of magnetic sensors), typically a Hall-effect or magneto-resistive sensor, the motion being such that the magnetic polarities alternately approach the sensor. The magnitude and/or frequency and/or phase of the signal indicative of the detected magnetic flux are related to the position and/or speed of the relative motion; the other quantities mentioned above (displacement and/or acceleration and/or displacement direction) may be derived from the position and/or speed.

In the geared motor, the electric motor has a drive shaft, and the geared motor comprises an output shaft, the gear or the gears being operatively arranged between the drive shaft of the electric motor and the output shaft; when at least two gears are present, the geared motor comprises at least one intermediate shaft.

According to the state of the art, in order to maximize the rotation angles to be detected, the encoder is associated with the drive shaft or with an intermediate shaft of the geared motor, still having a small reduction ratio with respect to the drive shaft, so that the rotation angles to be detected are large enough, as well as because of the need felt thus far to render the output shaft of the geared motor wholly available for the mechanical constraint with the component to be driven into rotation.

In some known derailleurs, it is even provided for an amplifier mechanism of the rotation angle which is detected by the encoder. In this case, one of the rotation shafts of the geared motor comprises an auxiliary toothed member, namely a toothed member which is not part of the kinematic chain embodied by said at least one gear of the speed reducer of the geared motor; the encoder is associated with an auxiliary shaft provided with a toothed member meshed with, and with a multiplier gear ratio with respect to, said auxiliary toothed member.

In both cases, moreover, the elements of the geared motor and of the encoder are typically individually coupled to either of the movable components between which the geared motor is interposed, what requires a particularly accurate and time-consuming assembly.

SUMMARY

The technical problem at the basis of the present disclosure is to make the transduction more accurate and reliable.

In an aspect, the present disclosure relates to a bicycle electric/electronic derailleur comprising: a plurality of mutually movable components, comprising a support body configured to be attached to a bicycle frame, a chain guide, and a pair of connecting arms comprising a proximal connecting arm and a distal connecting arm, for connection between the support body and the chain guide at respective articulation axes, comprising a support body-proximal connecting arm articulation axis, a support body-distal connecting arm articulation axis, a chain guide-proximal connecting arm articulation axis, and a chain guide-distal connecting arm articulation axis, and a geared motor for controlling the mutual motion of the plurality of mutually movable components, the geared motor comprising an electric motor having a drive shaft, an output shaft and a speed reducer including at least one gear—preferably a gear train—between said drive shaft and said output shaft, the output shaft defining at least in part one of said articulation axes, extended between a first and a second of the mutually movable components, the electric motor being rigidly connected to the first of the mutually movable, and the second of the mutually movable components integrally rotating with the output shaft, the derailleur comprising a transducer of a quantity related to the mutual motion of the mutually movable components, of the magnetic rotary encoder type, comprising a permanent magnet and a magnetic sensor responding to the changes in the magnetic field of the magnet, wherein the magnet is a disc or cylindrical or annular magnet having diametral magnetization, wherein the magnet is coaxial with and integrally rotates with the output shaft.

In the present description and in the attached claims, adjectives such as "proximal" and "distal" refer to the mounted condition of the derailleur on the bicycle. In particular, "proximal" is used to indicate closer to the frame and adjective "distal" is used to indicate farther from the frame.

In the present description and in the attached claims, under expression "rigidly connected" (and similar or derived expressions, such as "rigidly linked" or "rigidly coupled") referred to two elements, it is meant to indicate that the distance between a point of the first component and a point of the second component, the two points being selected in any manner, remains unchanged during the motion of the components; expression "integrally rotating" is used specifically to indicate the rigid connection when the motion is a rotation.

In the present description and in the attached claims, expression "with diametral magnetization" means that the separation plane between the north pole and the south pole of the magnet is a diametral plane.

In the present description and in the attached claims, under expression "permanent magnet" a body is meant, which is made in a ferromagnetic or paramagnetic, preferably ferromagnetic, material.

An annular magnet is sometimes also called toroidal magnet.

By carrying out the detections with the encoder directly on the output shaft of the geared motor, the transduced position (or other quantity) is more accurately indicative of the position (or other quantity) of the chain guide with respect to the support body, at the expenses of a certain encumbrance at the output shaft and the need to detect angles which are proportionally smaller with respect to angles detected according to the prior art; furthermore, the above mentioned auxiliary elements are avoided.

The geared motor may be in the form of a self-contained module comprising the magnet and the magnetic sensor.

In the present description and in the attached claims, under expression "self-contained", an independent object, complete in itself, is meant to be indicated. This provision allows the testing, assembly and replacement operations to be simplified, and to guarantee the accuracy of the mutual arrangement between magnet and sensor. It is also possible to make a single module suitable both for a rear derailleur and a front derailleur, with advantages in terms of production chain and warehouse storage.

The self-contained module-like geared motor may comprise a frame configured to support in a prefixed mutual relationship the motor, said at least one gear, the output shaft and the magnet, the frame being configured to be rigidly connected to the first component. Also this provision eases the derailleur assembly operations. Furthermore, by avoiding to individually support one or more rotation axes of the gears of the geared motor directly in the mutually movable components of the derailleur, the accuracy and stability of the mutual arrangement of the elements of the geared motor, and therefore the detecting accuracy, are greater.

The frame may be formed of two parts.

The frame may be configured to support the magnetic sensor.

The frame may be configured to support at least one first PCB bearing the magnetic sensor and any other electric/electronic components, including any components for controlling the derailleur.

The frame may be configured to further support a second PCB bearing electric/electronic components, including any components for controlling the derailleur.

The first and the second PCBs may be connected by a flexible PCB.

The first PCB may be transverse to the output shaft at a first end of the output shaft.

The magnetic sensor may be fixed on the face of the first PCB generally facing the output shaft. This provision allows the signal detected by the sensor to be maximized, because the distance between magnet and sensor may be reduced to what is strictly necessary to avoid rubbing during rotation of the output shaft. Furthermore, the sensor proves to be protected against impacts and during handling of the module.

The magnetic sensor may be arranged on the face of the first PCB opposed to the face facing the output shaft. Through this provision, although the distance between the sensor and the magnet increases, the magnetic sensor is made easily accessible, for example for diagnosis or to be replaced; furthermore, a space saving may be obtained in the axial direction of the output shaft.

The magnet may be permanently connected at an end of the output shaft. For example, the magnet may be permanently connected to the end face of the end of the output shaft.

In the present description and in the attached claims, a mechanical connection between two members is said to be "removable" if it allows them to be detached without the aid of tools, "permanent" if it allows them to be detached only with the aid of tools, and "fixed" it the detachment may only take place damaging at least one of the two members.

The magnetic sensor may be permanently connected at such a position as to face and be coaxial with the magnet. A gap extends axially between the magnet and the magnetic sensor.

Alternatively, the magnetic sensor may be permanently connected radially external to the output shaft, in a position, in an axial direction, corresponding to the position of the magnet. A gap extends between the magnet and the magnetic sensor in the radial direction.

A support or magnet holder may be provided for, having a recess configured to accommodate the magnet at least in part, and a protrusion opposed to the recess, configured to be inserted in an axial blind hole of the output shaft.

The recess may have a bottom and a peripheral edge protruding from the bottom, sized to accommodate a portion of the magnet, in a form-fitting manner.

The magnet may be glued in the recess.

The magnet holder may be made of plastics.

Alternatively, the magnet may be directly glued to an end face of the output shaft or, in the case of an annular magnet, it may interference-fitted and/or glued radially external to the output shaft, the latter being inserted in the central hole of the annular magnet.

The magnet may also be an annular magnet fixed at an intermediate portion of the output shaft.

In the present description and in the attached claims, the term "intermediate" is broadly used and does not necessarily imply a position equally spaced from two end positions.

The magnetic sensor may be permanently connected radially external to the output shaft and in a position corresponding, in axial direction, to the position of the annular magnet.

The output shaft may be cantilevered supported within the geared motor, namely it may have a first end coupled in the speed reducer, and an intermediate portion and a second end, opposed to the first end, which are free from said at least one gear and available for coupling with said second component.

Alternatively, the output shaft may be coupled in the geared motor at an intermediate portion of the output shaft, namely it may have both ends free from said at least one gear, and available for coupling with said second component.

The output shaft may be pivotally supported in the first component at an intermediate portion and/or in correspondence of at least one end of the output shaft. This provision allows a greater stability of the output shaft, contributing to a particularly accurate transduction.

Irrespectively of its relationship with the geared motor, the output shaft may have an intermediate portion configured for coupling with said second component.

Alternatively or additionally, the output shaft has at least one free end portion configured for coupling with said second component.

The portion(s) of the output shaft coupled with the second component is/are for example provided with a knurl.

The last gear of the geared motor may have a circular sector toothed member at the output shaft, so as to save space considering that the stroke of the chain guide is limited and corresponds to a rotation by an angle smaller than one turn. The circular sector may extend, for example, by an angle smaller than a right angle.

The first component is, for example, the support body.

When the derailleur is a rear derailleur, for example the first component is the support body and the second component is the proximal connecting arm.

When the derailleur is a front derailleur, for example the first component is the support body and the second component is the distal connecting arm.

The output shaft may be parallel to the drive shaft.

The output shaft may be orthogonal to the drive shaft, one of said at least one gear comprising a non-reversible coupling worm gear, namely wherein the worm of the worm gear may drive the worm wheel into rotation, but not vice versa.

The subject-matter disclosed herein also relates to a bicycle electric/electronic derailleur comprising: a plurality of mutually movable components, comprising a support body configured to be attached to a bicycle frame, a chain guide, and a pair of connecting arms comprising a proximal connecting arm and a distal connecting arm, for connection between the support body and the chain guide at respective articulation axes, comprising a support body-proximal connecting arm articulation axis, a support body-distal connecting arm articulation axis, a chain guide-proximal connecting arm articulation axis, and a chain guide-distal connecting arm articulation axis, and a geared motor for controlling the mutual motion of the plurality of mutually movable components, the geared motor comprising an electric motor having a drive shaft, an output shaft and a speed reducer including at least one gear between said drive shaft and said output shaft, the output shaft defining at least in part one of said articulation axes, extended between a first and a second of the mutually movable components, the second of the mutually movable components integrally rotating with the output shaft, the geared motor comprising a frame configured to support in a prefixed mutual relationship the motor, said at least one gear, and the output shaft, the frame being configured to be rigidly connected to the first of the components, the derailleur comprising a transducer of a quantity related to the mutual motion of the mutually movable components, of the magnetic encoder type, wherein the transducer is of the magnetic rotary encoder type, comprising a permanent magnet and a sensor responsive to the changes in the magnetic field of the magnet, the magnet is a disc or cylindrical or annular magnet having diametral magnetization, permanently connected at an end of the output shaft, the frame is configured to support a first PCB bearing the magnetic sensor and any other electric/electronic components, the first PCB being transverse to the output shaft at a first end of the output shaft, the sensor being supported on the first PCB at such a position as to face and be coaxial with the magnet.

The bicycle electric/electronic derailleur according to this aspect may comprise a support having a recess configured to accommodate the magnet at least in part, and a protrusion opposed to the recess, configured to be inserted in an axial blind hole of the output shaft.

Alternatively or additionally, in the bicycle electric/electronic derailleur according to this aspect, the output shaft may be cantilevered supported within the geared motor, having a first end coupled in the speed reducer, and an intermediate portion and a second end, opposed to the first end, which are free from said at least one gear and available for coupling with said second of said components.

Alternatively, in the bicycle electric/electronic derailleur according to this aspect, the output shaft may be coupled in the geared motor at an intermediate portion of the output shaft, having both ends free from said at least one gear, and available for coupling with said second of said components.

Alternatively or additionally, in the bicycle electric/electronic derailleur according to this aspect, the output shaft may have an intermediate portion configured for coupling with said second of the components and/or at least one free end portion configured for coupling with said second of the components.

Further secondary features of this aspect correspond to the secondary features described with reference to the first aspect, mutatis mutandis.

BRIEF DESCRIPTION OF THE DRAWINGS

Further features and advantages of the present invention will become clearer from the following detailed description of some preferred embodiments thereof, made with reference to the attached drawings, wherein:

FIG. 18 is a sectional view of the support body and of a proximal connecting arm of the rear derailleur of FIG. 17, wherein a chain guide and a distal connecting arm are conversely omitted for the sake of clarity.

FIG. 19 is an isometric view of still another geared motor.

FIG. 20 is a sectional view along plane XX-XX of FIG. 19, which also shows, in a totally schematic and partially cutaway manner, a derailleur component rigidly connected to the output shaft of the geared motor.

FIG. 21 is an isometric view of still another geared motor.

FIG. 22 is a sectional view along plane XXII-XXII of FIG. 21, which also shows, in a totally schematic and partially cutaway manner, a derailleur component rigidly connected to the output shaft of the geared motor.

DETAILED DESCRIPTION

In FIGS. 1-8 an articulated parallelogram bicycle electric/electronic front derailleur 1 is shown.

Figure 1:
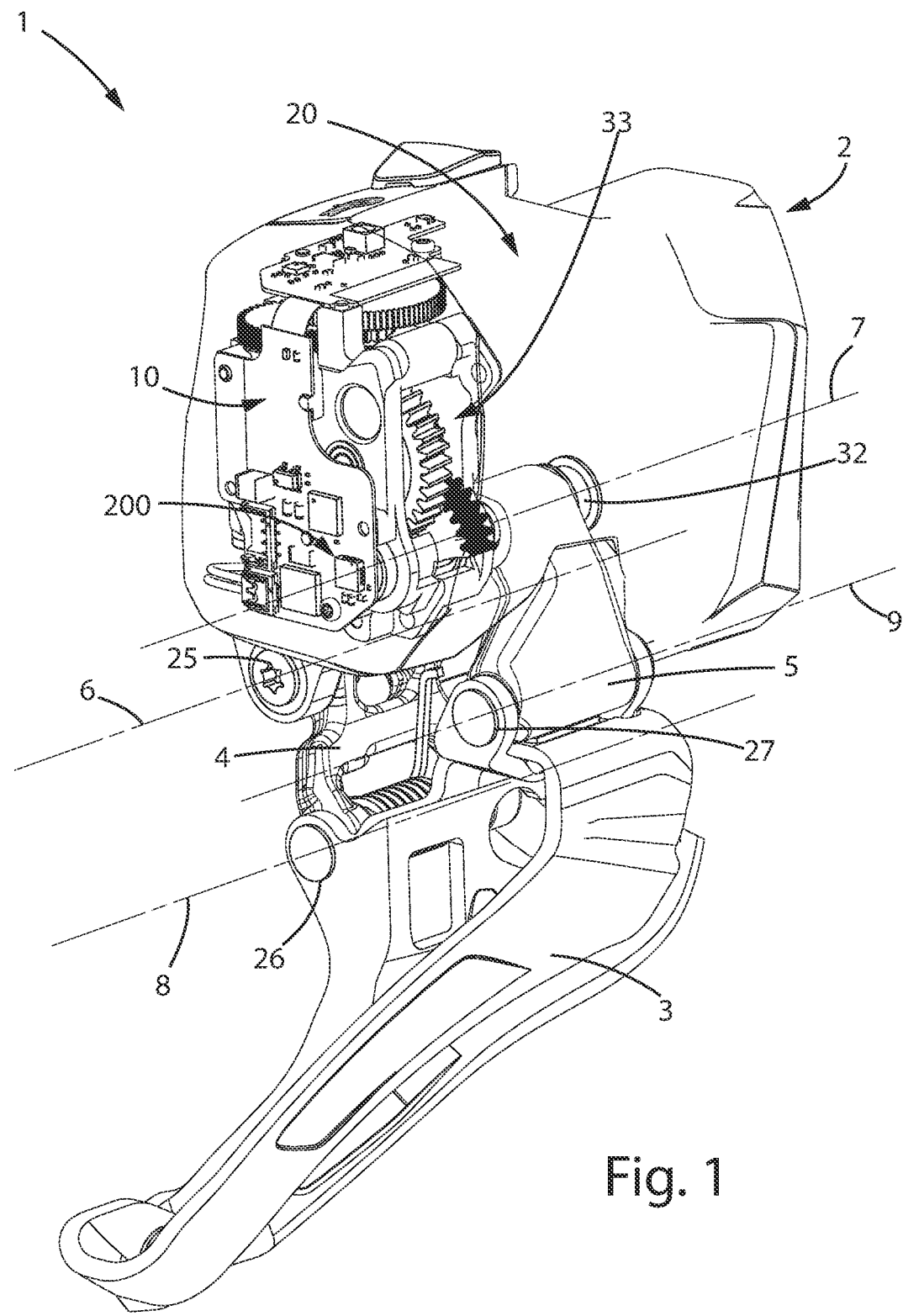
FIG. 1 is an isometric view of an articulated parallelogram bicycle front derailleur, wherein a casing of a support body is schematically shown as if it were transparent merely in order to make a geared motor visible.
Figure 2:
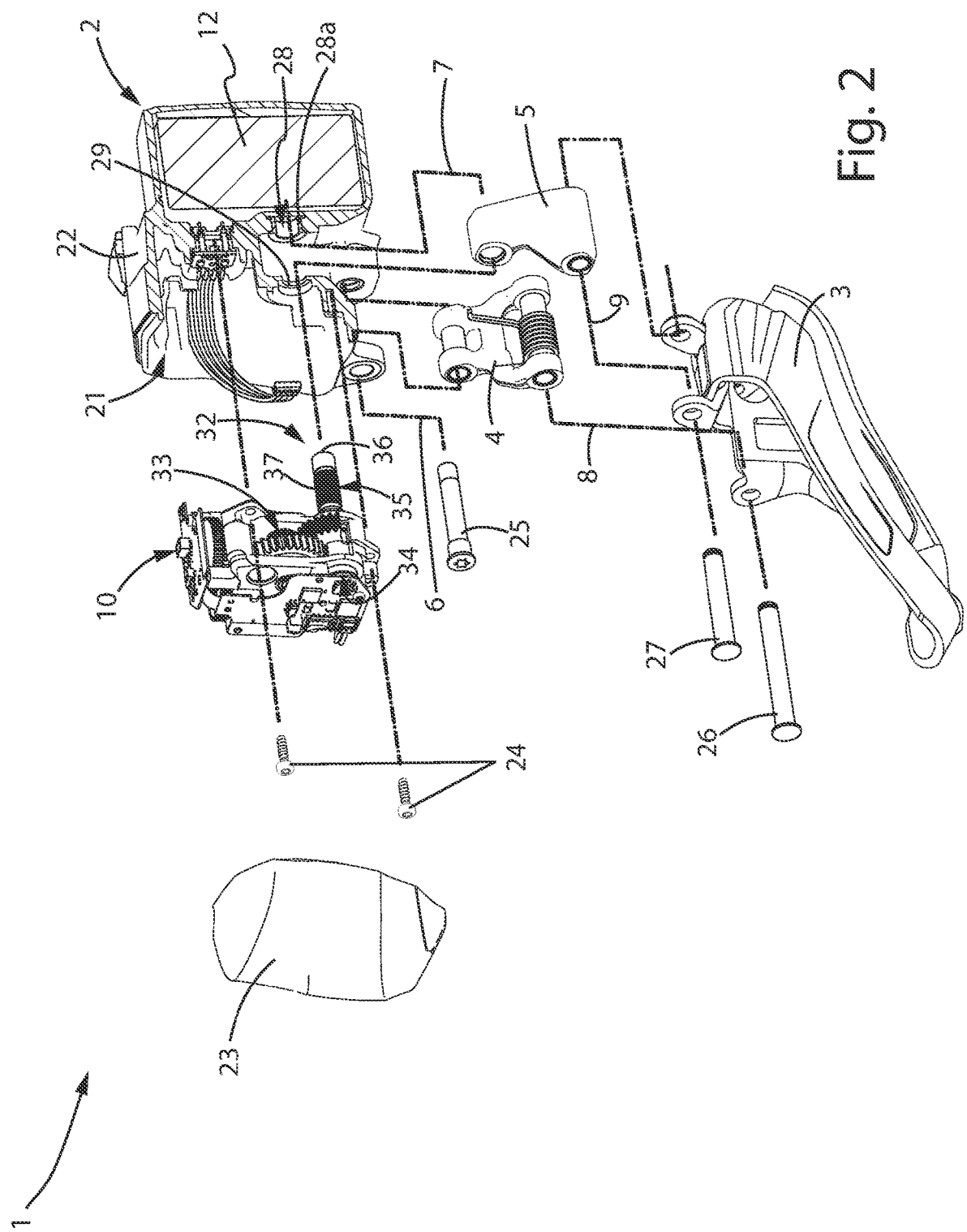
FIG. 2 is an isometric, partially exploded view of the front derailleur of FIG. 1, wherein the support body is shown in section.
Figure 3:
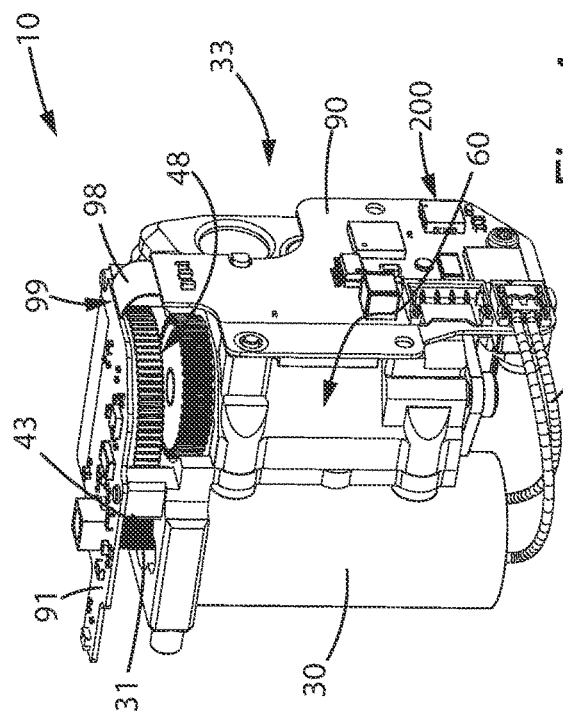
FIGS. 3-6 are isometric views, from different perspectives, of a geared motor of the derailleur.
Figure 4:
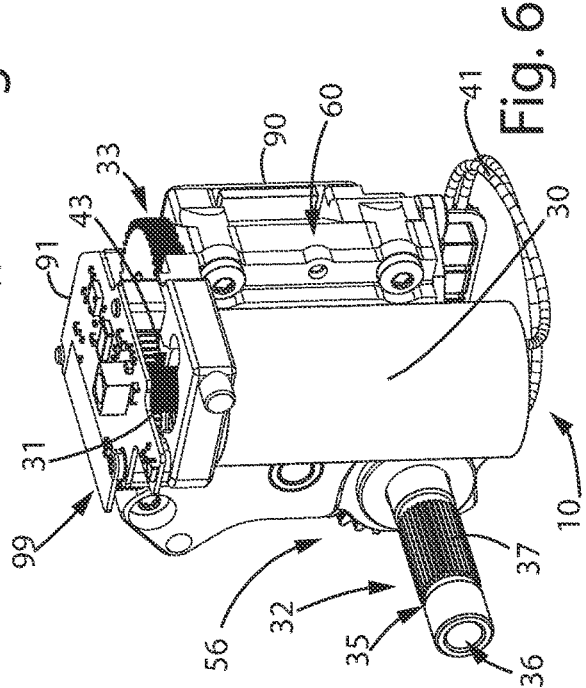
Figure 5:
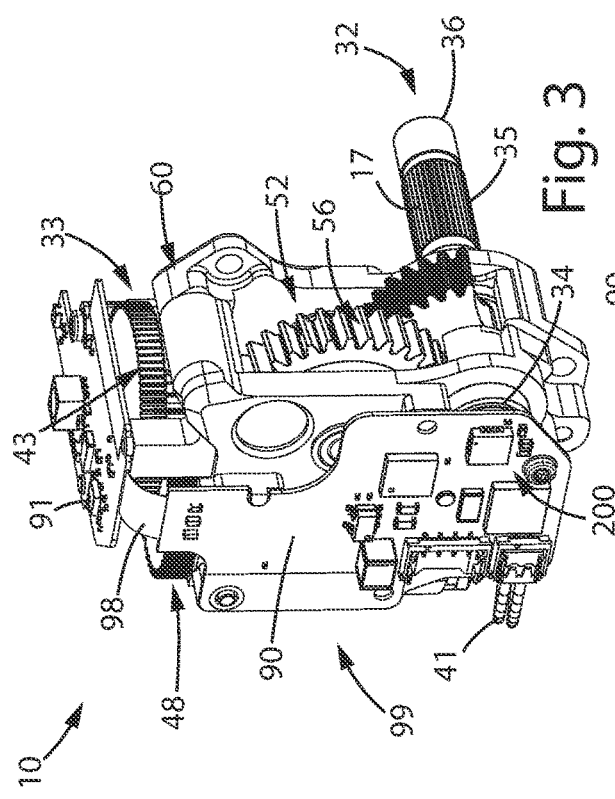
Figure 6:
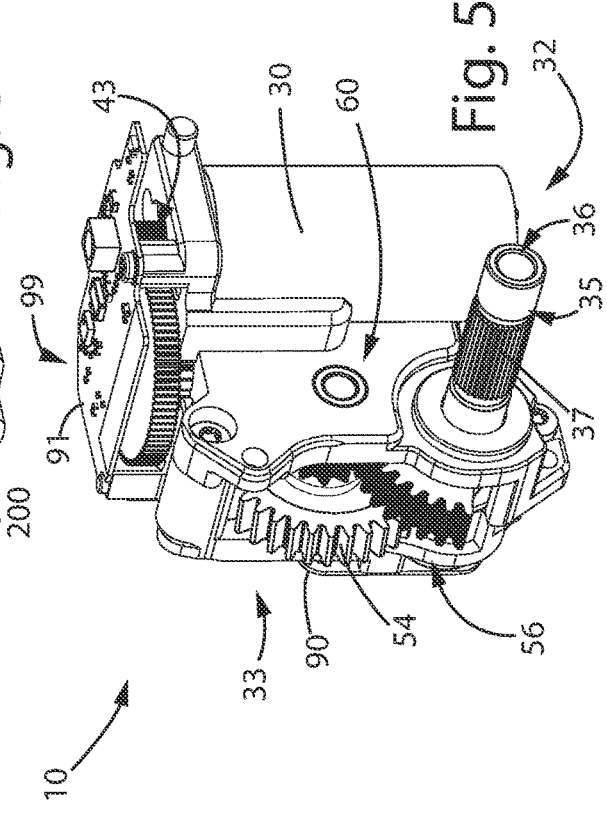
Figure 7:
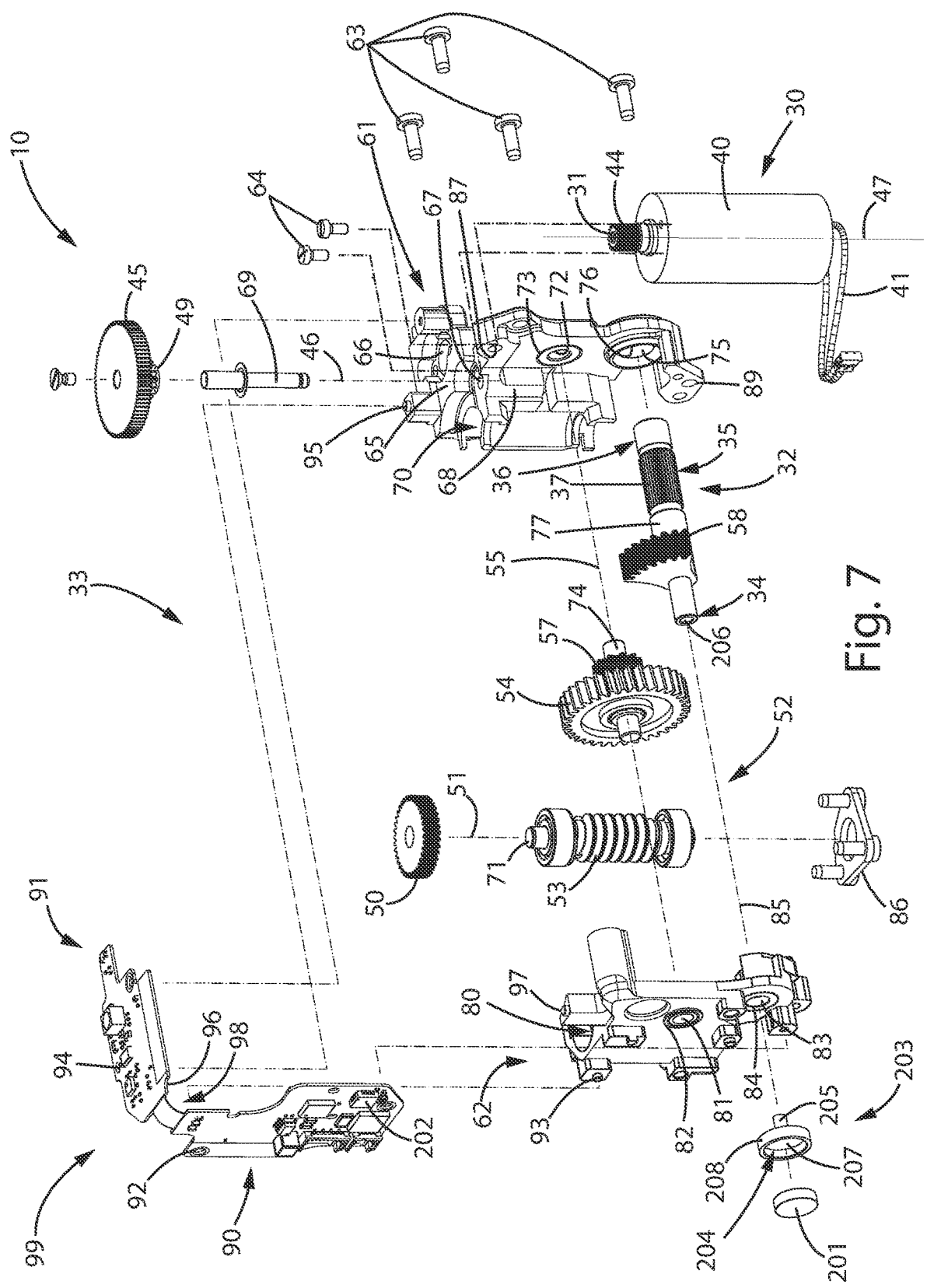
FIG. 7 is an isometric, exploded view, of the geared motor of FIG. 3.

With reference in particular to FIGS. 1-2, the derailleur 1 comprises a support body 2 configured to be attached to a bicycle frame, a chain guide 3, and a pair of connecting arms 4, 5 between the support body 2 and the chain guide 3, forming a plurality of mutually movable components. The pair of connecting arms comprises a proximal connecting arm 4 and a distal connecting arm 5. For example, the support body 4 may be attached to the frame through a strap, not shown, wrapped about the seat tube.

The mutually movable components 2, 3, 4, 5 may for example be made of steel, a light alloy, a techno-polymer, a composite material and similar.

The connecting arms 4, 5 are connected to the support body 2 and to the chain guide 3 at respective articulation axes: a support body-proximal connecting arm articulation axis 6, a support body-distal connecting arm articulation axis 7, a chain guide-proximal connecting arm articulation axis 8, and a chain guide-distal connecting arm articulation axis 9.

The electric derailleur 1 comprises a geared motor 10, better described hereinbelow with reference to FIGS. 3-7.

The derailleur 1 may also include a data processing system for controlling the geared motor 10 and any other electric/electronic components of the derailleur 1. The data processing system may comprise electric components and/or discrete electronic components and/or a micro-controller, which may also have integrated memory means. Said electric/electronic components may for example be borne by one or more printed circuit board(s) or PCB(s), which may be part of the geared motor 10 itself (cf. the PCBs 90, 91 described hereinbelow).

The geared motor 10 controls the mutual motion of the mutually movable components 2, 3, 4, 5, in particular it causes the aperture and closure of the articulated parallelogram, and therefore a displacement of the chain guide 3—with respect to the support body 2 and therefore to the bicycle frame—having at least one displacement component in the direction of the bottom bracket spindle, so as to bring the transmission chain (or belt) into engagement with a preselected toothed wheel or chainring of the "crankset".

As better described hereinbelow with reference also to FIGS. 3-8, the geared motor 10 comprises an electric motor 30 having a drive shaft 31, an output shaft 32 and a speed reducer 33 including a gear train—but which alternatively may also comprise a single gear—between said drive shaft 31 and the output shaft 32.

In the case shown, the derailleur 1 further comprises an electric power supply unit 12 comprising one or more secondary cells, for powering the geared motor 10 and said any other electric/electronic devices. The electric power supply unit 12 may also include at least one printed circuit board or PCB bearing electronic components for controlling the electric power supply unit 12. The electric power supply unit 12 may therefore be a so-called smart battery.

In the case shown, the electric power supply unit 12 is supported by the support body 2, but different locations of the electric power supply unit 12 are possible. Alternatively, the derailleur 1 might be powered in a cabled manner by an electric power supply unit located elsewhere on the bicycle.

In the case shown, the geared motor 10 is housed in the support body 2, that has to be understood as illustrative of the first component mentioned in the introductory part of the present description.

In order to house the geared motor 10, the support body 2 comprises a casing 20 wherein a chamber 21 is formed. In FIG. 1 the casing 20 is schematically shown as if it were transparent only in order to make the geared motor 10 visible. The casing 20 is formed by two portions 22, 23 that, after insertion of the geared motor 10 and whatever else has to be housed in the chamber 21, are fixedly connected to each other, for example through thermal welding, ultrasound welding, sealing, gluing etc. The connection of the two portions 22, 23 may be such as to ensure a hermetic seal and may take place for example forming a sort of labyrinth seal between their coupled edges, filled with resin, for example epoxy resin. Alternatively, the two portions 22, 23 of casing 20 may also be permanently connected, for example through screws.

The geared motor 10 is permanently connected, inside the chamber 21, for example through screws 24. In the case shown, the geared motor 10 is connected to the casing portion 22 and it is not connected to the casing portion 23, but alternatively, the casing portion 23 could be connected, in a fixed, permanent or removable manner, with the geared motor 10.

In the case shown merely by way of example, the output shaft 32 of the geared motor 10 is at, and coaxial with, the support body-distal connecting arm articulation axis 7, which it defines.

The output shaft 32 of the geared motor 10 integrally rotates with, and in general is rigidly connected to, the distal connecting arm 5.

The distal connecting arm 5 should therefore be understood as illustrative of the second component mentioned in the introductory part of the present description.

The other articulation axes 6, 8, 9 are defined, respectively, by pivots 25, 26, 27, extending into aligned holes of the components which each pivot 25, 26, 27 articulates, the holes not being numbered for the sake of simplicity.

In the case shown, the output shaft 32 is supported within the geared motor 10 in a cantilevered manner, namely it has a first end 34 coupled in the speed reducer 33, and it has an intermediate portion 35 and a second end 36, opposed to the first end 34, which are free from the gear(s) of the speed reducer 33, and available for coupling with the second component, the distal connecting arm 5 in the case shown, and possibly for being pivotally supported in the first component, the support body 2 in the case shown.

In the case shown, part of the intermediate portion 35 of the output shaft 32 is provided with a knurl 37, in order to be rigidly coupled to the distal connecting arm 5. Alternatively to a knurl, a grooved or keyed profile could be provided for.

In the case shown, the second end 36 of the output shaft 32 is pivotally supported in the first component, the support body 2 in the case shown. For example, the second end 36 of the output shaft 32 extends in a hole 28, which may be lined by an anti-friction bush 28a, of the support body 2.

In the case shown, also the intermediate portion 35 of the output shaft 32, in its part lacking the knurl, is pivotally supported in the first component, the support body 2 in the case shown, at a through hole 29.

Both these provisions increase the stability of the mechanism, but are not strictly necessary.

In FIGS. 3-7 an illustrative geared motor 10 is shown, which may be the geared motor of the derailleur 1, but which may (as will also become clear hereinbelow) be used in a derailleur even remarkably different from the derailleur 1.

As mentioned, the geared motor 10 comprises an electric motor 30 having a motor casing 40 housing, among other things, a stator and a rotor (not shown), the rotor being formed as one piece with, or integrally rotating with, the drive shaft 31 exiting the motor casing 40. Cables 41 for powering the electric motor 30 are shown.

In the case shown, a gear train or reducer 33 is operatively arranged between the drive shaft 31 and the output shaft 32 of the geared motor 10, although as already mentioned there might be a single reducer gear.

In the case shown, the gear train or reducer 33 comprises a first gear 43 formed by a first toothed wheel 44 integrally rotating with the end of the drive shaft 31 and by a second toothed wheel 45 pivotally supported about an axis 46 parallel to the axis 47 of the drive shaft 31; a second gear 48 formed by a third toothed wheel 49 coaxial and integrally rotating with the second toothed wheel 45 and by a fourth toothed wheel 50 pivotally supported about an axis 51 also parallel to the axis 47 of the drive shaft 31; a third, worm, gear 52 formed by a worm 53 extended along axis 51, coaxial and integrally rotating with the fourth toothed wheel 50, and a worm wheel 54 pivotally supported about an axis 55 orthogonal to the axis 51 and to the axis 47 of the drive shaft 31; a fourth gear 56 formed by a fifth toothed wheel 57 coaxial and integrally rotating with the worm wheel 54 and a toothed sector 58 integrally rotating with the output shaft 32.

The speed reduction ratio between the drive shaft 31 and the output shaft 32 of the geared motor 10 is given, in a manner per se well known, by the number of teeth of the various toothed members of the gear train 33.

Preferably, the first toothed wheel 44 has a smaller diameter than the second toothed wheel 45; the third toothed wheel 49 has a smaller diameter than the second toothed wheel 45 and than the fourth toothed wheel 50; the fifth toothed wheel 57 has a smaller diameter than the worm wheel 54 and than the toothed sector 58.

The provision of the toothed sector 58, instead of a toothed wheel, at the output shaft 32 allows space to be spared, considering that the stroke of the chain guide 3 is limited and corresponds to a rotation of the output shaft 32—and thus of the distal connecting arm 5—for an angle smaller than one turn. The circular sector 58 may extend for example for an angle smaller than a right angle, as in the case shown.

The gear train or speed reducer 33 may comprise a number and type of toothed members even remarkably different from that shown; furthermore, it is not strictly necessary that a worm gear is present. However, worm gear 52 may advantageously be a non-reversible worm gear, wherein the worm 53 may drive the worm wheel 54 into rotation, but not vice versa. In case of absence of a worm gear, or in case of two or an even number of such gears, the drive shaft 31 and the output shaft 32 may be parallel to each other. It is also possible to use bevel gears in such a manner that the drive shaft 31 and the output shaft 32 are mutually slanted, forming an angle therebetween different from a right angle.

The gear train or speed reducer 33 may comprise toothed members different from spur gears as present instead in the first gear 43, second gear 48 and fourth gear 56. For example, one or more bevel gears, crown gears, helical gears, hypoid gears, et cetera may be provided for.

The geared motor 10 shown is, as manifest from FIGS. 3-7, in the form of a self-contained module.

To this end, the geared motor 10 comprises a frame 60 configured to support in a prefixed mutual relationship the motor 30, the gears of the speed reducer 33 and the output shaft 32.

In the case shown, the frame 60 is formed of two parts 61, 62, permanently connectable to each other, for example through screws 63.

The frame 60 comprises holes wherein the drive shaft 31, the output shaft 32 and the rotation shafts of the toothed members of the gears of the speed reducer 33 are pivotally supported.

The two frame parts 61, 62 may further form a protective shell about the elements of the geared motor 1, not completely closed in the case shown, but which could also be essentially closed.

In the case shown, the first frame part 61 supports the motor 30, which is fixed for example through screws 64 to a "shelf" 65, or region, of the frame part 61 intended to be essentially horizontal in the mounted condition, the drive shaft 31 protruding through a through hole 66 of such shelf 65 of the frame part 61. The motor 30 may hang from the shelf 65, or a support at its basis may also be provided for.

In the case shown, the first frame part 61 has a through hole 67, for example made in a rib 68 of the first frame part 61, to pivotally support a pivot 69 to which the second toothed wheel 45 and the third toothed wheel 49 are fixed, a Seeger ring (not shown) being possibly provided for axially blocking the pivot 69.

In the case shown, the first frame part 61 defines a seat 70 for partially housing the worm 53 and for the rotation of a pivot 71 shared by the worm 53 and the fourth toothed wheel 50.

In the case shown, the first frame part 61 has a hole 72, which may be internally lined by a brass 73, for pivotally supporting a pivot 74 to which the worm wheel 54 and the fifth toothed wheel 57 are fixed.

In the case shown, the first frame part 61 has a through hole 75, which may be internally lined by a brass 76, for pivotally supporting the intermediate region 35 of the output shaft 32, preferably in a zone 77 of the output shaft 32, axially interposed between the toothed sector 58 and the knurl 37.

In the case shown, the second frame part 62 defines a seat 80 for partly housing the worm 53 and for the rotation of the pivot 71 shared by the worm 53 and the fourth toothed wheel 50.

In the case shown, the second frame part 62 has a hole 81, which may be internally lined by a brass 82, for pivotally supporting the pivot 74 to which the worm wheel 54 and the fifth toothed wheel 57 are fixed.

In the case shown, the second frame part 62 has a through hole 83, which may be internally lined by a brass 84, for pivotally supporting the first end 34 of the output shaft 32, coaxial to said hole 75 along the axis 85 of the output shaft 32, possibly with the interposition of a gasket 75a.

A base 86 may be provided for supporting the worm 53 from below; the base 86 may for example be permanently connected to the first part 61 and/or to the second part 62 of the frame 60. When the base 86 is permanently connected to both parts 61, 62 of the frame 60, as in the case shown, it also contributes to the mechanical stability of the geared motor 10 in the form of self-standing module.

The frame 60 has, in the case shown, holes 87, 89 in the part 61 of the frame 60 for the passage of the screws 24 (FIG. 2) for fixing to the first component of the derailleur 1, the support body 2 in the case under consideration.

It is understood that the specific shape of the frame 60 depends on the specific embodiment of the geared motor 10, and in particular on how many and which gears it has, and therefore it may be remarkably different from that shown and described merely by way of a non-limiting example.

The frame 60 may be configured to also support a battery power supply unit, alternatively or additionally to the battery power supply unit 12 which in the case shown merely by way of an example is directly supported by the upper body 2.

The geared motor 10 in the form of a self-contained module preferably further comprises one or more (two in the case shown) printed circuit boards or PCBs 90, 91, bearing the or some of the electric/electronic components of the derailleur 1.

In the case shown, the first PCB 90 is supported by the second frame part 62, for example through joining of holes 92 of the PCB 90 in pins 93 protruding from said second frame part 62 (only one pair hole 92—pin 93 is numbered for the sake of clarity). The first PCB 90 thus extends in a plane orthogonal to the output shaft 32 of the geared motor 10.

In the case shown, the second PCB 91 is supported by the shelf 65 of the first frame part 61, for example through joining of holes 94 of the PCB 91 in pins 95 protruding from said shelf 65 (only one pair hole 94—pin 95 is numbered for the sake of clarity), as well as from the second frame part 62, for example through alignment of a recess 96 of the PCB 91 with a pin 97 protruding from said second frame part 62 (only one pair hole 96—pin 97 is numbered for the sake of clarity).

Either one of the PCBs 90, 91 may also be screwed, with screws not shown, to the frame 60.

In the case shown, the PCBs 90, 91 turn out to extend in orthogonal planes, but this is not strictly necessary and they could extend in parallel planes.

In the case shown, the two PCBs 90, 91 are connected by a third flexible PCB 98, to form a rigid-flexible electronic assembly or, briefly, electronics 99, but this is not strictly necessary.

The electronics 99 may include components, for example a microprocessor or micro-controller, which embody said data processing system for controlling the geared motor 10, in particular the electric motor 30, briefly controller hereinbelow. The electronics 99 may also include or more communication modules, for example wireless, one or more possible antennae, cable connectors and/or other electric/electronic components.

The controller of the electric motor 30 responds, in a manner known per se, to gearshifting request signals and other signals requesting a displacement of the derailleur, for example for adjustment thereof, coming from manual actuation members controlled by the cyclist or other human operator, and/or to detections of quantities relative to the route and/or to the physical status of the cyclist.

Of particular interest herein, the controller of the electric motor 30 further responds to the signal emitted by a transducer 200 (FIG. 1) of (at least) a quantity related to the mutual motion of the components 2-5 of the derailleur 1, also called encoder 200. The quantity is an angular quantity and it is therefore a rotary encoder.

The transduced quantity is, for example, an angular position and/or an angular displacement and/or an angular speed and/or an angular acceleration and/or a displacement direction or rotation direction.

The signal transduced by the encoder 200 is used in a suitable manner for controlling the derailleur 1: for example, the motor 30 may be powered until the transduced signal corresponds to the intended position of the derailleur 1, or the motor 30 may be powered for a predetermined time and possibly powered again for correcting the position in case the transduced signal does not correspond to the intended position of the derailleur 1.

The encoder 200 comprises a permanent magnet 201 and a sensor 202 responsive to the changes in the magnetic field of the magnet 201.

The magnet 201 is, in the case shown, a disc magnet with diametral magnetization.

The permanent magnet may be for example a two-pole magnet of neodymium iron boron (NdFeB).

The sensor 202 is, for example, a Hall effect or magneto-resistive sensor.

Differently from conventional derailleurs, wherein—as mentioned in the introductory part—the magnet is made integral with the drive shaft or with an intermediate shaft of the geared motor, or to a multiplier mechanism associated with one of those shafts, in the case shown the magnet 201 is conversely coaxial and integrally rotating with the output shaft 32 of the geared motor 10.

In the case shown, the magnet 201 is arranged at the first end 34 of the output shaft 32 of the geared motor 10, in particular it is rigidly connected to the end face of the first end 34.

Figure 8:
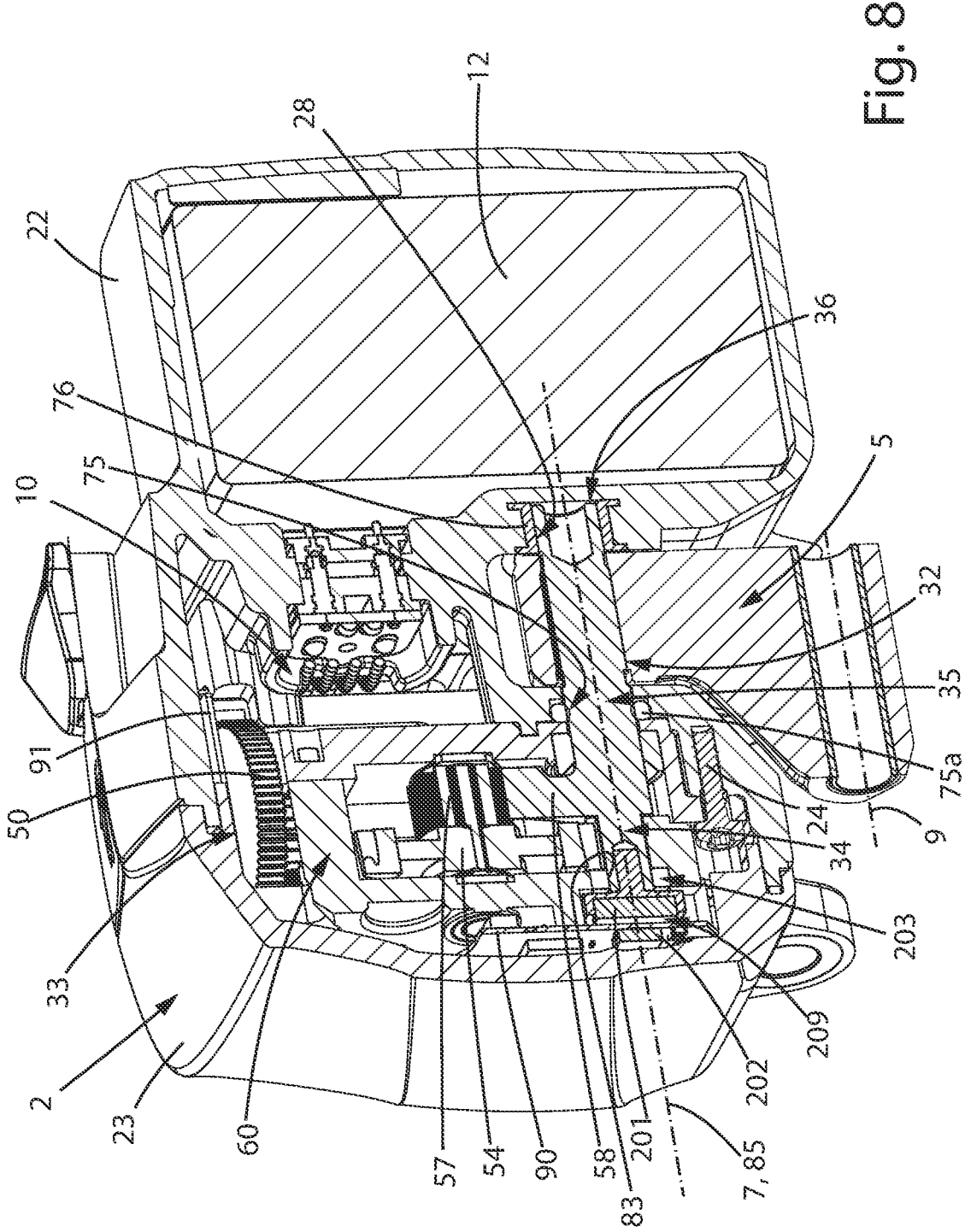
FIG. 8 is an isometric, sectional view of a support body and a distal connecting arm of the derailleur of FIG. 1, wherein a proximal connecting arm and a chain guide are conversely omitted for the sake of clarity.

With reference also to the perspective sectional view of FIG. 8 (wherein the proximal connecting arm 4 and the chain guide 3 are omitted for greater clarity), the magnetic sensor 202 is borne by the first PCB 90 in such a position as to face and be coaxial with the magnet 201 when the first PCB 90 is fixed to the frame 60.

In the case shown, the magnetic sensor 202 is fixed to the face of the first PCB 90 opposed to the face facing the output shaft 32, namely on the face of the first PCB 90 which turns out to be external when the geared motor 10 is mounted, so as to be easily accessible, for example for diagnosis or to be replaced. Furthermore, in this manner a space savings in the axial direction of the output shaft 32 may be attained.

It is further noted that between the magnet 201 and the PCB 90, a gap 209 is provided for, avoiding frictions during the motion of the output shaft 32, and which does not interfere with the magnetic field, just as the material of which typically a PCB is formed. From the magnetic point of view, between the magnet 201 and the magnetic sensor 202 an axial gap is present, which comprises the gap 209 and the thickness of the PCB 90.

Alternatively, the magnetic sensor 202 may be fixed on the face of the first PCB 90 facing the output shaft 32, so as to be more protected against shocks and during handling of the geared motor 1; furthermore, by reducing the distance between magnet 201 and sensor 202 (axial gap) to what is strictly necessary to avoid rubbing during the rotation of the output shaft 32, the signal detected by the sensor 202 may be maximized.

Turning back to FIG. 7, in the case shown the magnet 201 is borne by a support or magnet holder 203. In the case shown, the magnet holder 203 has a recess 204 configured to accommodate the magnet 201 at least in part, and a protrusion 205 opposed to the recess 204, configured to be inserted in an axial blind hole 206 of the output shaft 32, made in the end face of its first end 34.

The recess 204 may have a bottom 207 and a peripheral edge 208 protruding from the bottom 207, sized to accommodate a portion of the magnet 201 in a form-fitting manner.

The magnet 202 may be glued in the recess 204.

The magnet holder 203 may be made for example in plastics.

It should be emphasized that the magnet holder 203 is however not necessary: for example, the magnet 201 may be directly glued or fixed in a different manner to the end face of the output shaft 32.

Alternatively to a disc magnet with diametral magnetization, the magnet 201 may be a cylindrical magnet with diametral magnetization or an annular magnet (also named toroidal magnet) with diametral magnetization.

It is understood that the magnetic field generated by the magnet 201 and detected by the sensor 202 is variable in a related manner to the mutual motion between permanent magnet 201 and sensor 202, in turn related to the mutual motion between the output shaft 32 and the frame 60 of the geared motor 10, namely between the two components of the derailleur 1 with which they are integral, respectively the distal connecting arm 5 and the upper body 2 in the case shown.

Thanks to the fact that the encoder 200 detects the motion at the output shaft 32 of the geared motor 1, the detected angles (and/or the other detected angular quantities) directly correspond to the position of the distal connecting arm 5—or other movable component of the derailleur 1—rigidly connected thereto and integrally rotating therewith, without proportionality factors, which might lead to a less accurate detection of the condition of the articulated parallelogram, in turn indicative of the position of the chain guide 3 with respect to the support body 2—and therefore indicative of the position of the transmission chain with respect to the bicycle frame.

Furthermore, by the fact that an auxiliary amplifying mechanism of the angles to be detected is not necessary, the geared motor 1 turns out to be simpler, more compact and lighter with respect to the conventional ones, provided with that auxiliary amplifying mechanism.

Thanks to the fact that, as in the case shown, the magnetic sensor 202 is directly supported in the geared motor 1, forming part of the self-contained geared motor module, the accuracy of the mutual arrangement with the magnet 201 (axial alignment in the case shown) may be easily guaranteed. Furthermore, possible tests of the encoder 200, just as its replacement, turn out to be remarkably more practical than conventional derailleurs, wherein the encoder and any rotation axes of the gears of the geared motor are individually supported directly by the mutually movable components of the derailleur.

Figure 9:
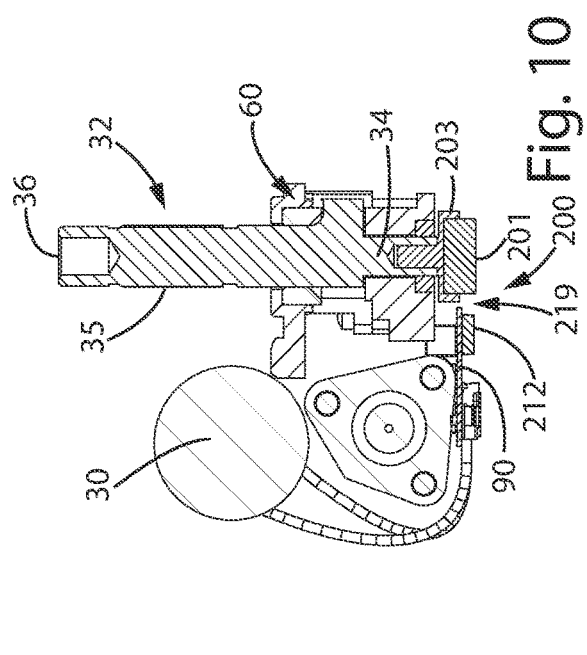
FIG. 9 is an isometric view of another geared motor.
Figure 10:
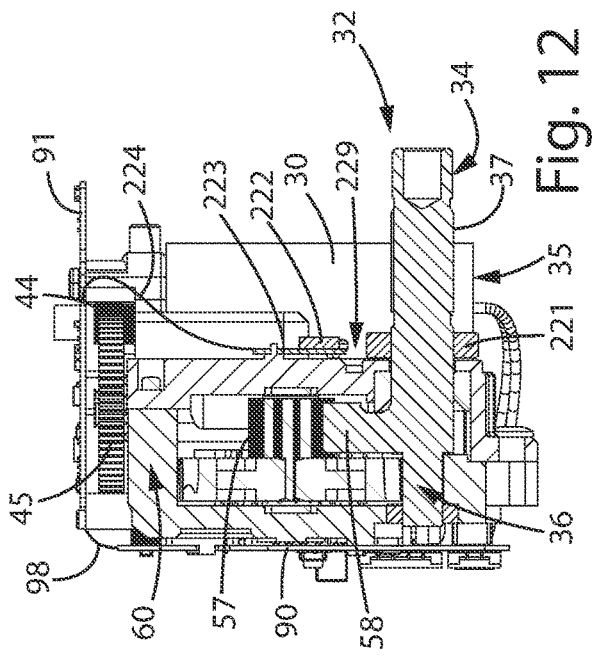
FIG. 10 is a sectional view along plane X-X of FIG. 9.

With reference to FIGS. 9-10, the geared motor 10 may be modified by arranging the magnetic sensor, herein referred to as magnetic sensor 212, radially external to the output shaft 32, in a position, in axial direction, corresponding to the position of the magnet 201. A gap 219 is formed in the radial direction between the magnet 201 and the magnetic sensor 212.

For example, in the case shown the magnetic sensor 212 is placed, on the PCB 90, in a position radially adjacent to the end face of the first end 34 of the output shaft 32, with the interposition of said radial gap 219.

In the case shown, the magnetic sensor 212 is aligned with the magnet 201 along a plane (plane X-X along which the section of FIG. 10 is taken) orthogonal to the first PCB 90 and parallel to the second PCB 91, but this is not strictly necessary.

The magnetic sensor 212 is arranged on the face of the first PCB 90 opposed to the face generally facing the output shaft 32, but also in this case it could be on the other face of the PCB 90, that facing the output shaft.

In the case shown, furthermore, the first PCB 90 is shaped, through a recess 210, so as not to have any region facing the, and coaxial with, the first end 34 of the output shaft 32, thus making the magnet 201 easily accessible, for example to be replaced or re-glued in case of detachment from the magnet holder 203. However, also this provision is not strictly necessary, in that a small axial distance between magnet 201 and magnetic sensor 212 (as there might be in the case of a PCB 90 lacking the recess 210 and sensor 212 on its outer face) may be tolerated and may also be avoided altogether when the magnetic sensor 212 is arranged on said other face of the PCB 90.

With the arrangement of the magnetic sensor shown in FIGS. 9-10, there may be a reduction of the crosswise size of the geared motor 10, in the axial direction of the output shaft 32, substantially corresponding to the size of the gap 209 and to the thickness of the PCB 90 of FIGS. 1-8.

However, the configuration of FIGS. 1-7 may allow a greater detection sensitivity, and simplifies the mutual arrangement (alignment) between magnet 201 and sensor 212.

Figure 11:
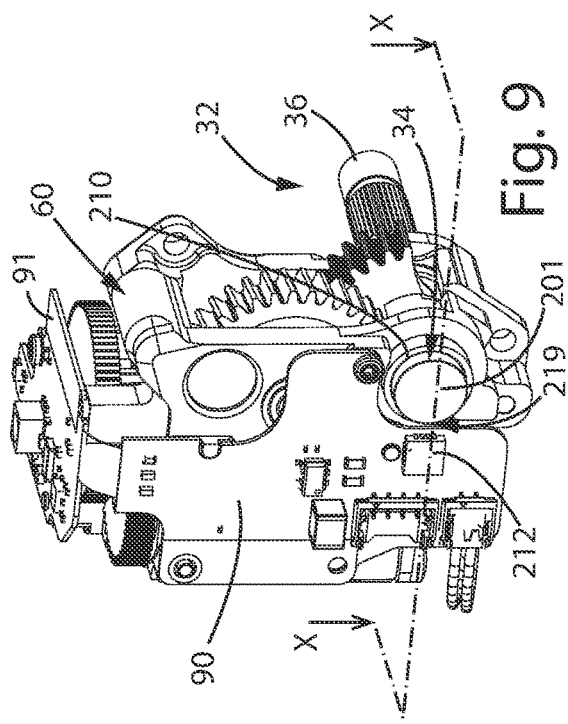
FIG. 11 is an isometric view of another geared motor.
Figure 12:
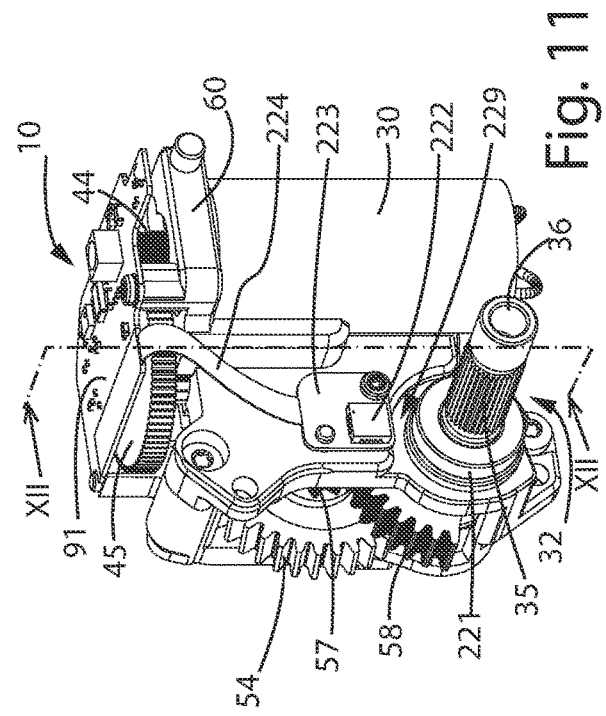
FIG. 12 is a sectional view along plane XII-XII of FIG. 11.

With reference to FIGS. 11-12, the magnet, indicated herein as magnet 221, and the magnetic sensor, indicated herein as magnetic sensor 222, may be arranged at the intermediate portion 35 of the output shaft 32, in a zone of the output shaft 32 without the knurl 37.

The magnet 221 is an annular magnet with diametral magnetization, and the magnetic sensor 222 is arranged radially external to the output shaft 32 and in a position corresponding, in axial direction, to the position of the magnet 221, for example on a respective PCB 223. A gap 229 is formed in the radial direction between the magnet 221 and the magnetic sensor 212.

In the case shown, the PCB 223 is connected, for example through a flexible PCB 224, to the second PCB 91, but it could also be connected to the first PCB 90, or, moreover, the PCB 223 bearing the magnetic sensor 222 might replace the first PCB 90. In other terms, the PCB 90 could be suitably displaced, namely fixed to the first frame part 61 rather than to the second frame part 62, and bear the magnetic sensor 222 and any other electric/electronic components.

The annular magnet 221 may interference-fitted and/or glued radially external to the output shaft 32, which is inserted in the central hole of the annular magnet 221.

Figure 13:
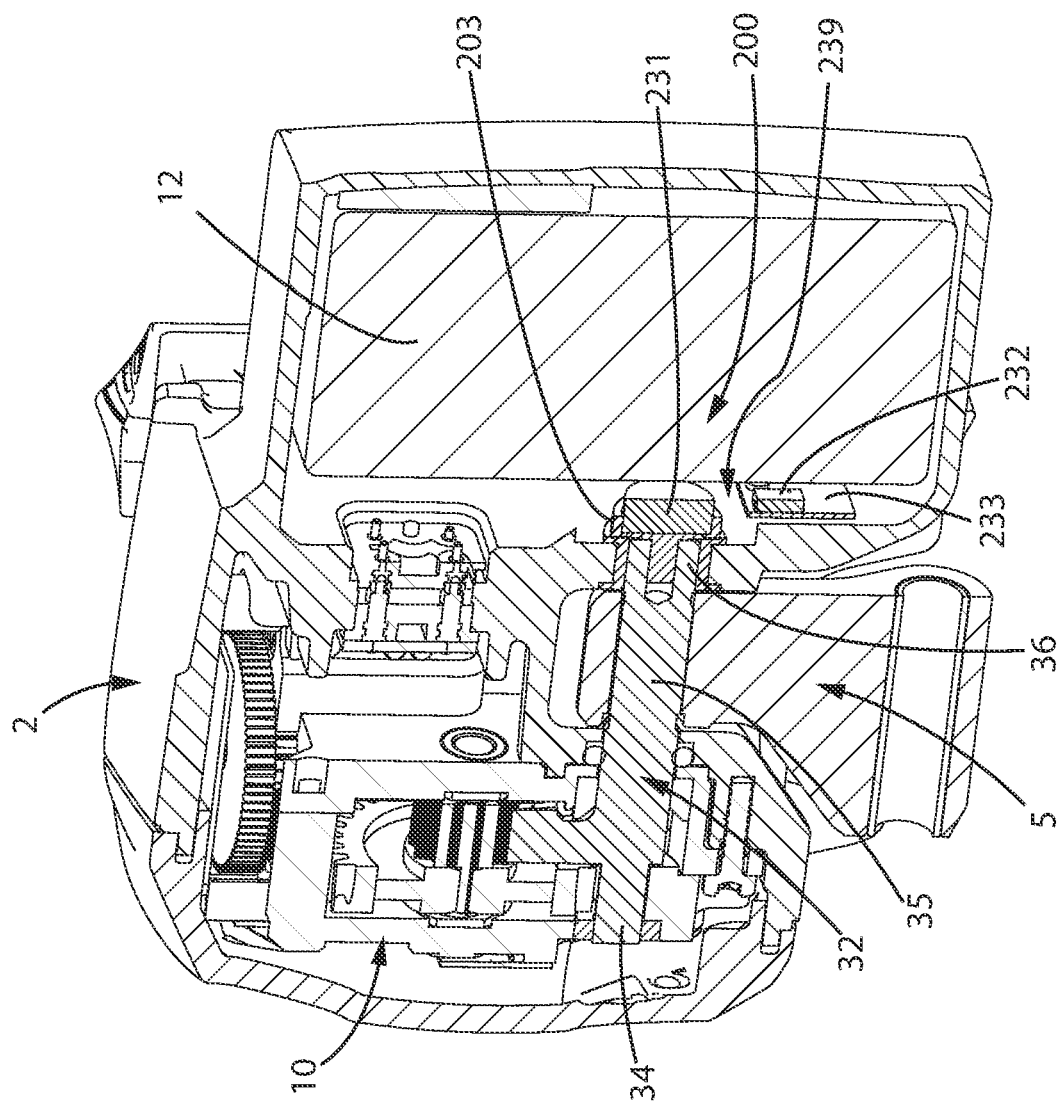
FIG. 13 is a view corresponding to FIG. 8, with still another geared motor, and with a different orientation.

With reference to FIG. 13, the magnet, indicated herein as magnet 231, and the magnetic sensor, indicated herein as magnetic sensor 232, may be arranged at the second end 36 of the output shaft 32.

In the case shown, the magnet 231 is permanently connected to the end face of the second end 36, and the magnetic sensor 232 is arranged adjacent thereto, radially external to the output shaft 32, in a position corresponding, in axial direction, to the position of the magnet 231. A gap 239 is formed in the radial direction between the magnet 231 and the magnetic sensor 232.

Alternatively, the magnetic sensor 232 could be arranged coaxial to the magnet 231 in an axially spaced position, analogously to what is shown in FIG. 8.

In the case shown, the magnetic sensor 232 is permanently connected to the support body 2, possibly through a respective PCB 233, and therefore it is not part of the self-standing module geared motor 10.

The connections of the PCB 233 are not shown for the sake of simplicity.

Figure 14:
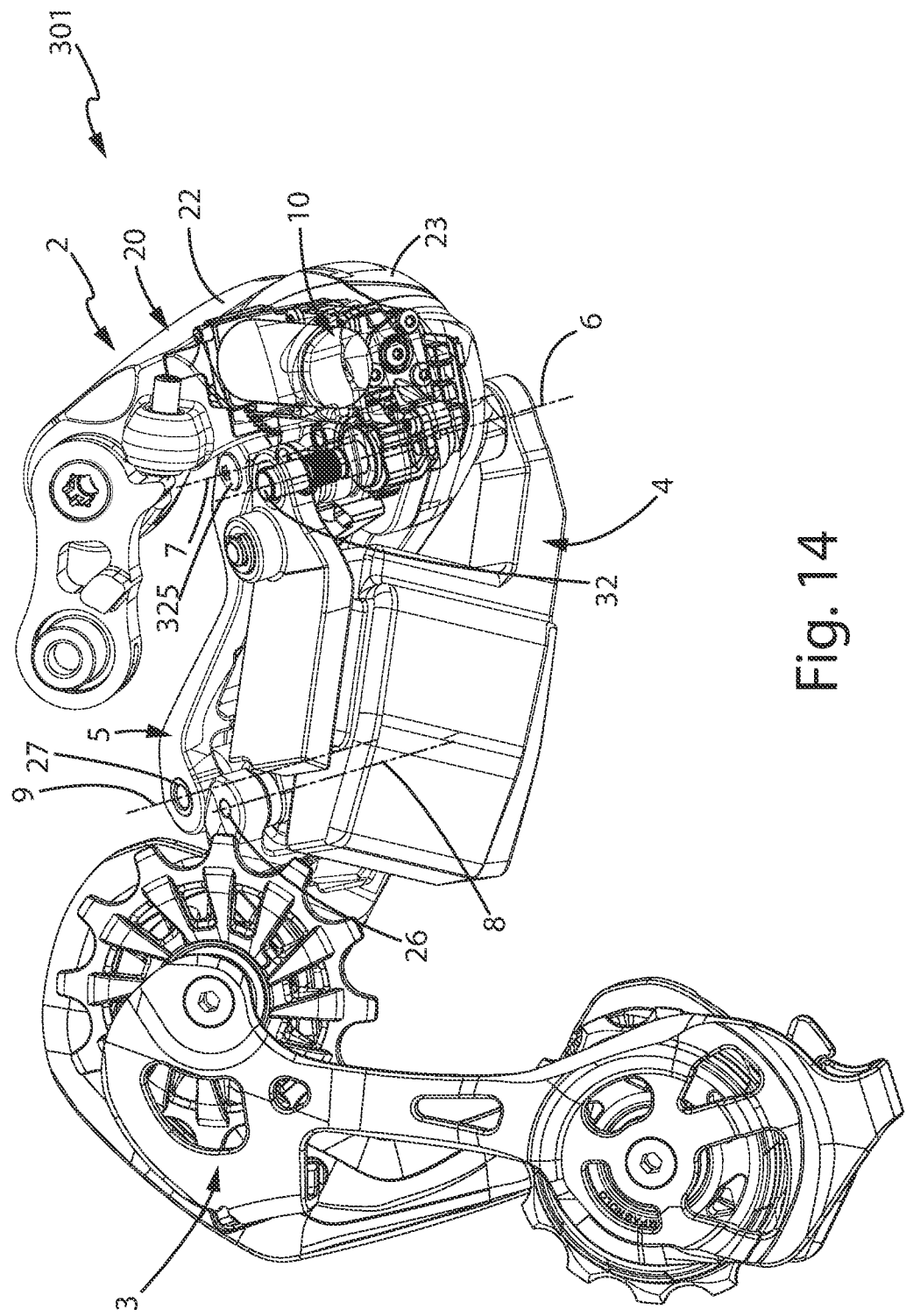
FIG. 14 is an isometric view of an articulated parallelogram bicycle rear derailleur, wherein a casing of a support body is schematically shown as if it were transparent merely in order to make the geared motor visible.
Figure 15:
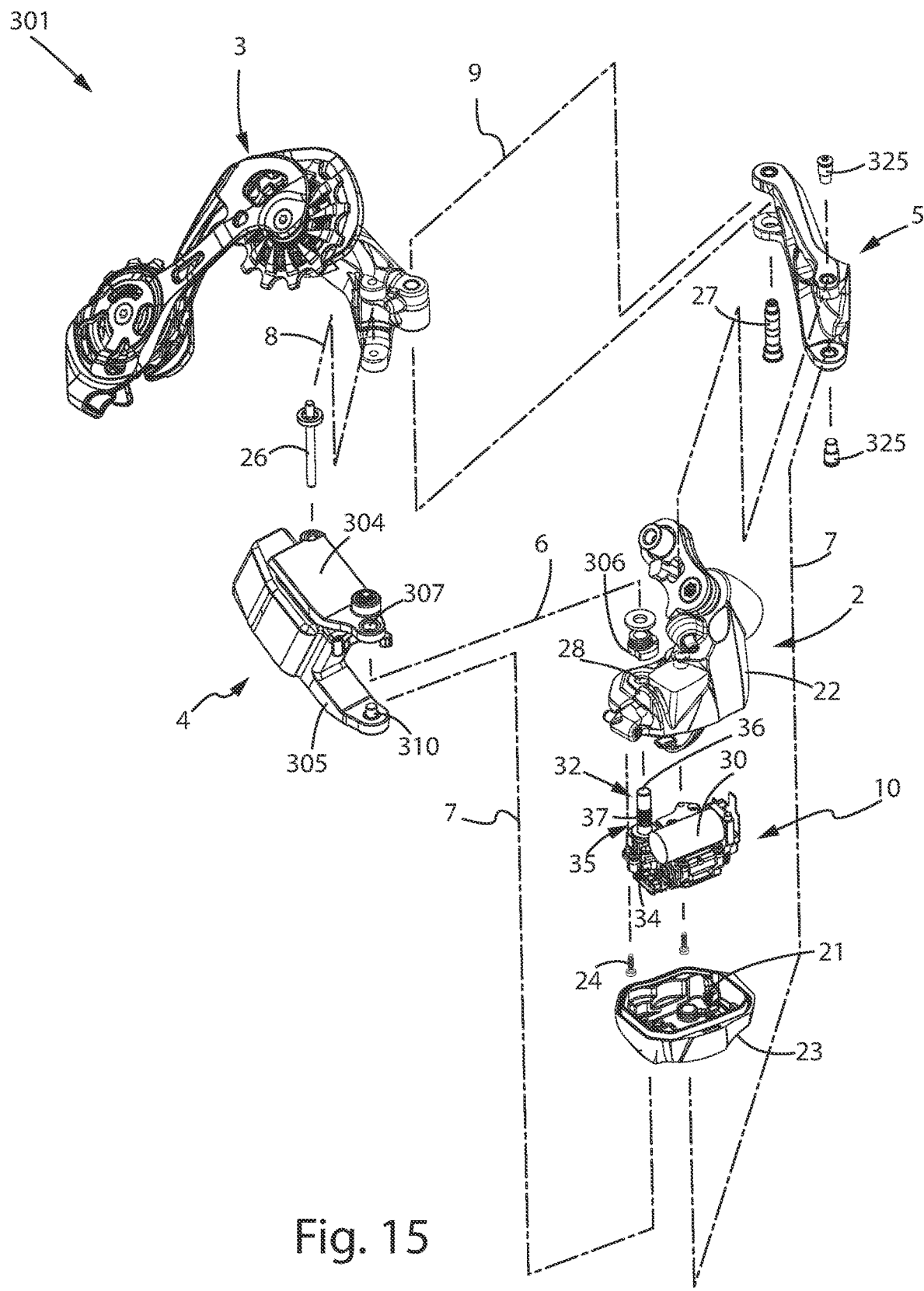
FIG. 15 is an isometric, partially exploded view of the rear derailleur of FIG. 14.
Figure 16:
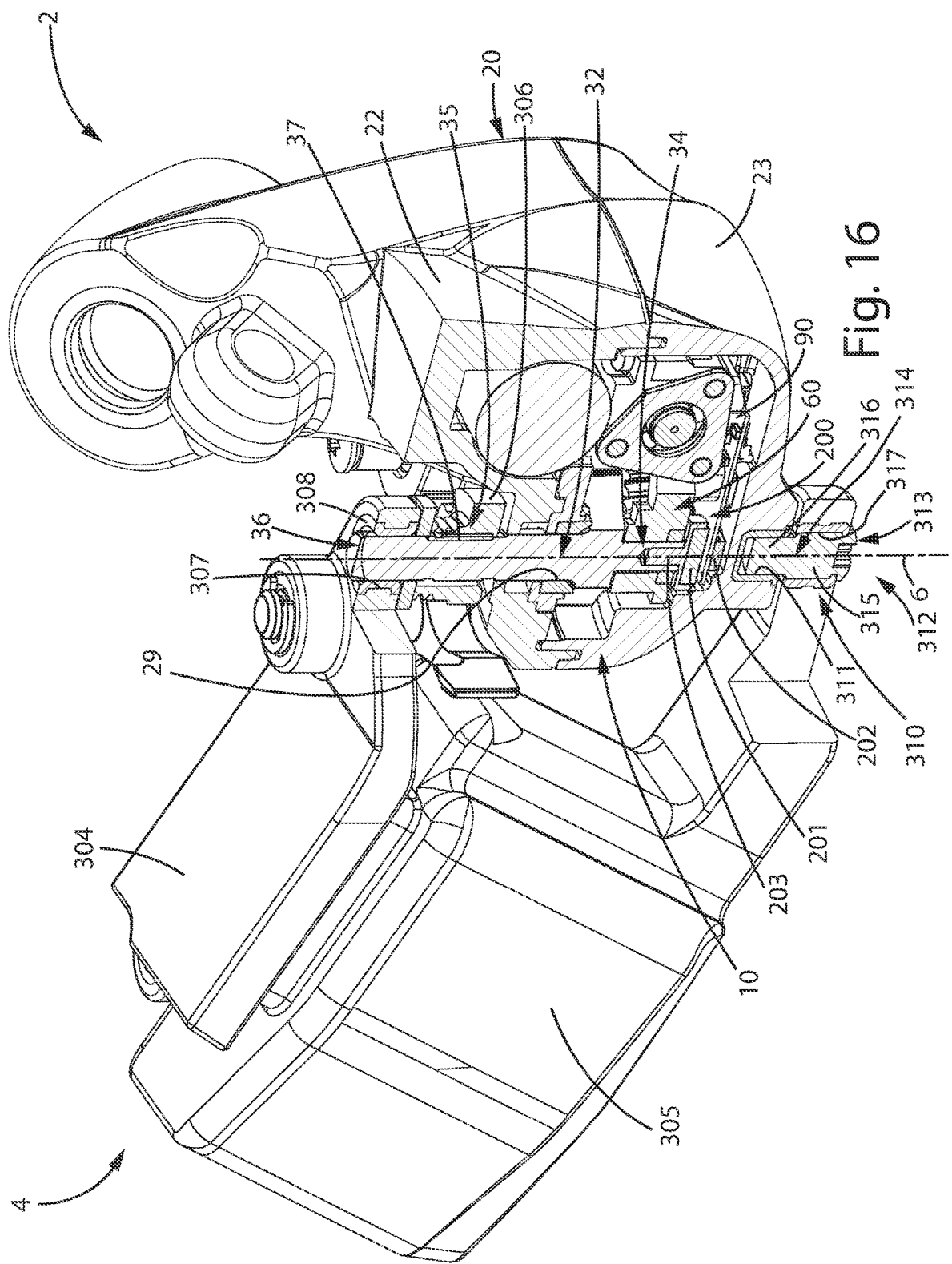
FIG. 16 is a sectional view of the support body and of a proximal connecting arm of the derailleur of FIG. 15, wherein a chain guide and a distal connecting arm are conversely omitted for the sake of clarity.

In FIGS. 14-16 an articulated parallelogram bicycle electric/electronic rear derailleur 301 is shown.

Also derailleur 301 comprises a support body 2 configured to be attached to a bicycle frame, a chain guide 3 and a pair of connecting arms 4, 5 between the support body 2 and the chain guide 3. For example, the support body 4 may be attached to the frame through a connection device so-called "articulated joint".

In the case of the derailleur 301, the geared motor 10 controls the mutual motion of the mutually movable components 2, 3, 4, 5, in particular it causes the opening and closure of the articulated parallelogram, and thus a displacement of the chain guide 3 having at least one displacement component in the direction of the axis of the toothed wheel group associated with the hub of the rear wheel or "sprocket assembly", so as to bring the transmission chain (or belt) into engagement with a predetermined toothed wheel or sprocket of the sprocket assembly.

Although the mutually movable components 2-5 of the rear derailleur 301 have a rather different configuration than the corresponding mutually movable components 2-5 of the front derailleur 1 described above, the previous description of the derailleur 1, including the respective variants and optional features, applies mutatis mutandis to the rear derailleur 301. In the drawings, members of the rear derailleur 301 equal to or corresponding to members of the front derailleur 1 are numbered with the same reference numerals.

A detailed description of the rear derailleur 301 is omitted for the sake of brevity; hereinbelow, instead, the differences with respect to the front derailleur 1 are highlighted.

In the case of the rear derailleur 301 shown, the geared motor is still housed in the support body 2 (part of the support body 2 is shown as if it were transparent in FIG. 14 only in order to make the geared motor 10 visible), but the output shaft 32 of the geared motor 10 is at, and coaxial with, the support body-proximal connecting arm articulation axis 6, which it defines in part. A pair of pivots 325 defines instead the support body-distal connecting arm articulation axis 7.

With particular reference to the isometric, sectional view of FIG. 16, wherein the chain guide 3 and the distal connecting arm 5 are omitted for the sake of clarity, the proximal connecting arm 4 is made, in the case shown, of two parts 304, 305 suitably permanently connected after assembly, for example through keying, gluing, welding, screws etc. The part 304 of proximal connecting arm is configured to be coupled in an integrally rotating manner with—in the case shown through a drum 306 of a release device—the intermediate portion 35 of the output shaft 32 provided with the knurl 37 or splined profile. The release device, per se well known, has the function of disengaging the output shaft 32 of the geared motor 10 from the rest of the kinematic chain when the drive torque is excessive, for example in case of seizing of the chain guide 3, or in case of a shock acting from the outside on the connecting arms 4, 5 or on the chain guide 3. The output shaft 30 and the drum 306 are interference-fitted through, for example, the above-mentioned external knurl 37 of the intermediate portion 35 of the output shaft 30. The part 304 of proximal connecting arm furthermore has a hole 307, which may be internally lined with a reinforcement insert 308 having a complementary profile, which receives, in a loose-fit coupled manner, the second end 36 of the output shaft 32. The second end 36 of the output shaft 32 is therefore pivotally supported in the proximal connecting arm 4.

The output shaft 32 extends through a through hole 28 of the portion 22 of the casing 20 of the upper body 2 to which the geared motor 10 is permanently connected.

A hermetic seal gasket (not shown) may be provided for between the through hole 28 and the output shaft 32.

In the case shown, the part 305 of the proximal connecting arm 4 is articulated to the support body 2, in particular it is articulated through a pivot 310 rigidly connected thereto and extended in a blind hole 311 of the portion 23 of casing 20.

In detail, in the case shown the blind hole 311, which may be provided with a blind bushing (not numbered for the sake of clarity), is coaxial with the support body-proximal connecting arm articulation axis 6, in proximity of the first end 34 of the output shaft 32 of the geared motor 10.

In the case shown, the pivot 310 is formed in an element 312 comprising a screwing tool engagement head 313, and a stem 314 extending from the head 313. A portion 315 of the stem 314 contiguous to the head 313 is provided with an external threading, and the remaining portion 316 of the stem 314 has no threading.

The portion 315 provided with an external threading is screwed in an internally threaded through hole 317 of the proximal connecting arm 4, which may be formed in an insert (not numbered for the sake of clarity); the portion 316 lacking threading, protruding from the through hole 317, forms said pivot 310.

In the derailleur 301 of FIGS. 14-16, the encoder 200 comprises a disc magnet 201 with diametral magnetization and a magnetic sensor 202 placed in a manner totally corresponding to the elements of the encoder 200 of FIGS. 1-8. In particular, the magnet 201 is arranged at the first end 34 of the output shaft 32 of the geared motor 10, in particular it is permanently connected—through the magnet holder 203—to the end face of the first end 34; the magnetic sensor 202 is borne by the first PCB 90 in such a position as to face, and be coaxial with, the magnet 201 when the first PCB 90 is fixed to the frame 60.

To the derailleur 301 one or more of the possible changes mentioned with reference to derailleur 1 apply, mutatis mutandis, only some of which are illustrated below for the sake of brevity.

Figure 17:
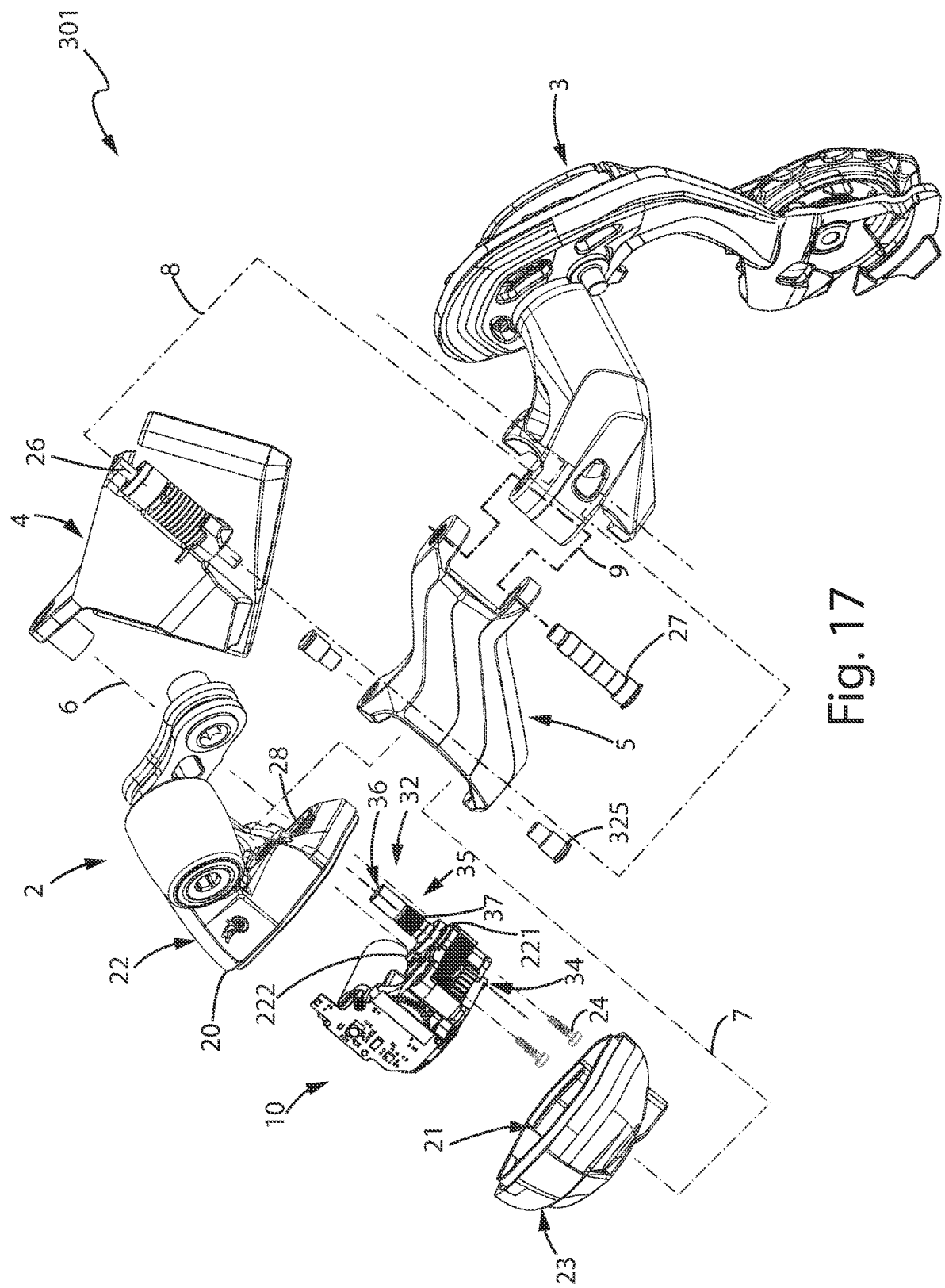
FIG. 17 is an isometric, partially exploded view of another rear derailleur.

With reference to FIGS. 17-18, also in the case of the rear derailleur 301, a magnet 221 and a magnetic sensor 222 may be provided for, arranged at the intermediate portion 35 of the output shaft 32, in an analogous manner to what has been shown and described with reference to FIGS. 11-12.

In the case shown, the rear derailleur 301 has a one-piece proximal connecting arm 4, integrally rotating with the second end 36 of the output shaft 32. The release device lacks. The knurl 37 may, alternatively to what has been shown, be made only or also at the free end 36 of the output shaft 32.

These variants and changes are, however, not bound to the different arrangement of the encoder 200, and may apply also to the case wherein the encoder 200 is located as in FIGS. 14-16 or in still other manners. Vice versa, the different arrangement of the encoder 200 also applies to the case of two-piece proximal connecting arm 4 as exemplified by FIGS. 14-16.

Furthermore, also in the rear derailleur 301—and independently of the configuration of its proximal connecting arm 4—it is possible, in an analogous manner to what is shown in FIGS. 9-10, to arrange the magnetic sensor 212 radially external to the output shaft 32, in a position, in axial direction, corresponding to the position of the magnet 201, also in the case wherein the magnet 201 is arranged on the end face of the first end 34 of the output shaft 32.

Furthermore, also in the rear derailleur 301—and independently of the configuration of its proximal connecting arm 4—it is possible, in an analogous manner to the derailleur 1 shown in FIG. 13, to arrange the magnet 231 and the magnetic sensor 232 at the second end 36 of the output shaft 32. In this case, the second end 36 of the output shaft 32 is made to protrude from the proximal connecting arm 4, the latter being rigidly connected to the intermediate region 35 of the output shaft 32.

For example, the magnet 231 may be permanently connected to the end face of the second end 36 and the magnetic sensor 232 may be arranged adjacent thereto, radially external to the output shaft 32, in a position corresponding, in axial direction, to the position of the magnet 231 (cf. FIG. 13), or be coaxial therewith in an axially spaced position (in a manner similar to FIGS. 8 and 16).

In these cases, the magnetic sensor 232 is permanently connected to the support body 2, possibly through a respective PCB, and thus it is not part of the self-standing module geared motor 1.

It is worthwhile emphasizing that the geared motor 10 in the form of a self-contained module is advantageously identical in the front derailleur 1 and in the rear derailleur 301. At most, the axial length of the region provided with the knurl 37 of the intermediate portion 35 of the output shaft 32 and/or the number of gears and/or the sizes and/or the number of teeth of one or more gears may differ, so as to have different speed ratios between the drive shaft 31 and the output shaft 32 in the two cases.

As shown in FIGS. 19-22, the output shaft 32 may be coupled within the geared motor 10 in a non-cantilevered manner, namely at its intermediate portion 35, then having both ends 34, 36 free from the gears and available for coupling with the second component of the derailleur, for example one of the connecting arms 4, 5— besides optionally for pivotal support by the first component, for example the support body 2.

Figures 19, 20, 21, 22:
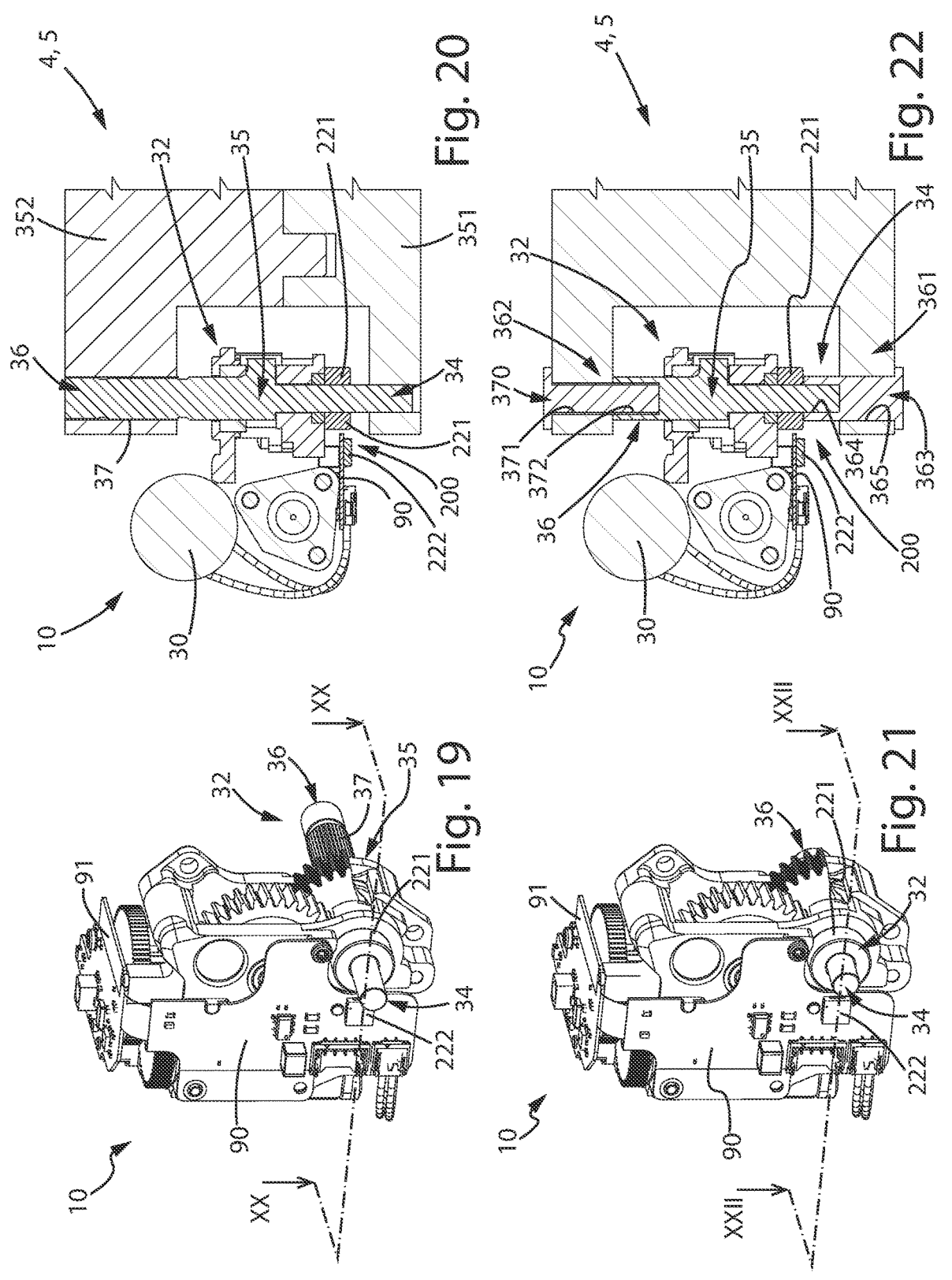

For example, as shown in FIGS. 19-20, the second component, for example one of the connecting arms 4, 5, may be made of two parts, indicated therein with references 351, 352, suitably permanently connected after assembly of the derailleur 1, 301, for example in one of the manners described with reference to FIGS. 14-16.

Or, as shown in FIGS. 21-22, the connecting arm 4, 5 (or other second component) may be made as one piece having two coupling regions 361, 362 spaced by a length corresponding to or longer than the length of the output shaft 32, which may thus be inserted therebetween. Each coupling region 361, 362 of the second component is connected to the respective end 34, 36 of the output shaft 32.

In the case shown, between the coupling region 361 and the first end 34 of the output shaft 32, a loose-fit coupling is provided for, through a peg 363 having an axial blind hole 364; the peg 363 is stuck in a through hole 365 of the coupling region 361, the first end 34 of the output shaft 32 being loosely inserted within the blind hole 364.

In the case shown, between the coupling region 362 and the second end 36 of the output shaft 32, a rigid connection is provided for, so that they integrally rotate, through a peg 370 having an external knurl; the peg 370 is stuck in a through hole 371 of the coupling region 362 and in a blind hole 372 formed at the second end 36 of the output shaft 32.

The two couplings, respectively loosely and rigid, might be inverted between the two coupling regions 361, 362, or they could both be rigid connections, for example by providing for an external knurl on the output shaft 32 and an internal knurl within the blind hole 364, so that the output shaft 32 is stuck also in the blind hole 364.

In the case shown in FIGS. 19-22, the encoder 200 is arranged in the intermediate region 35 of the output shaft 32; the permanent magnet 221 of the encoder 200 is an annular magnet and the magnetic sensor 222 is arranged radially external to the output shaft 32 and in a position corresponding, in axial direction, to the position of the magnet 221.

In the case shown, the configuration and arrangement of the magnetic sensor 222 and of the first PCB 90 correspond to that shown in FIGS. 9-10.

However, it is understood that an arrangement of the encoder 200 analogous to that shown in FIGS. 11-12 may also be used.

Also in the case of non-cantilevered output shaft 32, it is possible to arrange the encoder 200 at either end 34, 36 of the output shaft 32, in a manner similar to that shown in FIGS. 8, 13, 16.

The output shaft 32, also in the case wherein it is non-cantilevered supported within the geared motor 10, may be pivotally supported in the first component of the derailleur 1, 301, to which the geared motor 10 is permanently connected, at its intermediate portion 35 (cf. for example FIGS. 20, 22) and/or at least one of its ends 34, 36, so as to confer a greater stability of the output shaft 32.

Although it has been described with reference to a geared motor 10 housed within the support body 2 having the output shaft 32 at the support body-distal connecting arm articulation axis 7 in the case of the front derailleur 1 and at the support body-proximal connecting arm articulation axis 6 in the case of the rear derailleur 301, the subject-matter disclosed herein applies to other derailleur configurations.

Thus, the geared motor 10 may be housed within the support body 2, but have an output shaft 32 at the support body-proximal connecting arm articulation axis 6 in the case of the front derailleur 1 and/or at the support body-distal connecting arm articulation axis 7 in the case of the rear derailleur 301.

In both the front derailleur 1 and the rear derailleur 301, the geared motor 10 may also be permanently connected in the chain guide 3 and have the output shaft 32 at the chain guide-proximal connecting arm articulation axis 8 or at the chain guide-distal connecting arm articulation axis 9; it may be permanently connected in the proximal connecting arm 4 and have the output shaft 32 at the chain guide-proximal connecting arm articulation axis 8 or at the support body-proximal connecting arm articulation axis 6; it may be permanently connected in the distal connecting arm 5 and have the output shaft 32 at the support body-distal connecting arm articulation axis 7 or at the chain guide-distal connecting arm articulation axis 9; the changes to be made in each case being clear in the light of the present description.

Those skilled in the art will understand that the derailleur 1, 301 may also have a shape even considerably different from that shown, and/or additional components not shown for the sake of simplicity.

The various embodiments, variants and/or possibilities of each component or group of components that have been described are to be meant as combinable with each other in any manner, unless they are mutually incompatible.

The above is a description of various embodiments of inventive aspects, and further changes can be made without departing from the scope of the present invention. The shape and/or size and/or location and/or orientation of the various components and/or the succession of the various steps can be changed. The functions of an element or module can be carried out by two or more components or modules, and vice-versa. Components shown directly connected to or contacting each other can have intermediate structures arranged in between them. Steps shown directly following each other can have intermediate steps carried out between them. The details shown in a figure and/or described with reference to a figure or to an embodiment can apply in other figures or embodiments. Not all of the details shown in a figure or described in a same context must necessarily be present in a same embodiment. Features or aspects that turn out to be innovative with respect to the prior art, alone or in combination with other features, should be deemed to be described per se, irrespective of what is explicitly described as innovative.

The invention claimed is:

1. A bicycle electric/electronic derailleur comprising:
   i) mutually movable components, comprising
      a support body configured to be attached to a bicycle frame,
      a chain guide, and
      a pair of connecting arms comprising a proximal connecting arm and a distal connecting arm, for connection between the support body and the chain guide at respective articulation axes, the articulation axes comprising a support body-proximal connecting arm articulation axis, a support body-distal connecting arm articulation axis, a chain guide-proximal connecting arm articulation axis, and a chain guide-distal connecting arm articulation axis,
   ii) a geared motor for controlling mutual motion of the mutually movable components, the geared motor comprising an electric motor having a drive shaft, an output shaft and a speed reducer, the speed reducer including at least one gear between the drive shaft and the output shaft,
   wherein the output shaft defines at least in part one of the articulation axes, extended between a first and a second of the mutually movable components, the electric motor being rigidly connected to the first of the mutually movable components, wherein the second of the mutually movable components is arranged to integrally rotate with the output shaft, and
   iii) a magnetic rotary encoder configured to transduce a quantity related to the mutual motion of the mutually movable components, the magnetic rotary encoder comprising a permanent magnet and a magnetic sensor responding to changes in a magnetic field of the permanent magnet,
   wherein the permanent magnet is a disc, cylindrical or annular magnet having diametral magnetization, and
   wherein the permanent magnet is coaxial with and arranged to integrally rotate with the output shaft.

2. The bicycle electric/electronic derailleur according to claim 1, wherein the geared motor is a self-contained module geared motor comprising the permanent magnet and the magnetic sensor.

3. The bicycle electric/electronic derailleur according to claim 2, wherein the self-contained module geared motor comprises a frame configured to support in a prefixed mutual relationship the electric motor, the at least one gear, the output shaft and the permanent magnet, the frame being rigidly connectable to the first of the mutually movable components.

4. The bicycle electric/electronic derailleur according to claim 3, wherein the frame is further configured to support the magnetic sensor.

5. The bicycle electric/electronic derailleur according to claim 4, wherein the frame is further configured to support a first printed circuit board bearing the magnetic sensor, and optional additional electric/electronic components, the first printed circuit board being transverse to the output shaft at a first end of the output shaft.

6. The bicycle electric/electronic derailleur according to claim 1, wherein the permanent magnet is permanently connected at an end of the output shaft.

7. The bicycle electric/electronic derailleur according to claim 6, wherein the magnetic sensor is permanently connected at a sensor position where the magnetic sensor faces, and is coaxial with, the permanent magnet.

8. The bicycle electric/electronic derailleur according to claim 6, wherein the magnetic sensor is permanently connected radially externally to the output shaft, in a sensor position axially corresponding to a magnet position of the permanent magnet.

9. The bicycle electric/electronic derailleur according to claim 6, further comprising:
   a support having a recess configured to accommodate, at least partially, the permanent magnet, and a protrusion opposed to the recess, configured to be inserted in an axial blind hole of the output shaft.

10. The bicycle electric/electronic derailleur according to claim 1, wherein the permanent magnet is an annular magnet fixed at an intermediate portion of the output shaft.

11. The bicycle electric/electronic derailleur according to claim 10, wherein the magnetic sensor is permanently connected radially externally to the output shaft, in a sensor position axially corresponding to a magnet position of the annular magnet.

12. The bicycle electric/electronic derailleur according to claim 1,
   wherein the output shaft is a cantilevered output shaft supported within the geared motor, having a first end coupled in the speed reducer, and
   wherein an intermediate portion of the output shaft and a second end of the output shaft, opposed to the first end, are free from the at least one gear and accessible for coupling with the second of the mutually movable components.

13. The bicycle electric/electronic derailleur according to claim 1, wherein the output shaft is coupled in the geared motor at an intermediate portion of the output shaft, the output shaft having both ends free from the at least one gear, and accessible for coupling with the second of the mutually movable components.

14. The bicycle electric/electronic derailleur according to claim 1,
   wherein the output shaft has
      an intermediate portion configured for coupling with the second of the mutually movable components and/or
      at least one free end portion configured for coupling with the second of the mutually movable components.

* * * * *